(12) United States Patent
Shaw

(10) Patent No.: US 8,646,720 B2
(45) Date of Patent: Feb. 11, 2014

(54) MODULAR FLIGHT VEHICLE WITH WINGS

(76) Inventor: Donald Orval Shaw, El Segundo, CA (US)

( * ) Notice: Subject to any disclaimer, the term of this patent is extended or adjusted under 35 U.S.C. 154(b) by 0 days.

(21) Appl. No.: 13/104,969

(22) Filed: May 10, 2011

(65) Prior Publication Data

US 2012/0119016 A1    May 17, 2012

Related U.S. Application Data

(60) Provisional application No. 61/332,817, filed on May 10, 2010.

(51) Int. Cl.
*B64C 27/08* (2006.01)
(52) U.S. Cl.
USPC ........................ 244/17.23; 244/17.27; 244/7 C
(58) Field of Classification Search
USPC .............. 244/7 R, 7 C, 17.23, 17.27
See application file for complete search history.

(56) References Cited

U.S. PATENT DOCUMENTS

| | | | | |
|---|---|---|---|---|
| 1,726,062 A * | 8/1929 | Gilman | ............................ | 244/25 |
| 1,794,202 A * | 2/1931 | Pickard | ............................ | 244/66 |
| 2,082,376 A * | 6/1937 | Boettner | ........................ | 244/7 R |
| D171,509 S * | 2/1954 | Lightbourn | ................ | 244/23 C |
| 2,987,272 A * | 6/1961 | Vogt | ............................. | 244/17.23 |
| 3,081,964 A * | 3/1963 | Quenzler | ..................... | 244/7 R |
| 3,181,810 A * | 5/1965 | Olson | ............................ | 244/7 R |
| 3,246,861 A * | 4/1966 | Curci | ............................. | 244/7 A |
| 3,273,653 A * | 9/1966 | McLarty | ..................... | 244/17.23 |
| 3,591,109 A * | 7/1971 | McLarty | ..................... | 244/17.23 |
| 3,934,843 A * | 1/1976 | Black | ............................. | 244/7 C |
| 4,149,688 A * | 4/1979 | Miller, Jr. | .................... | 244/12.4 |
| 4,591,112 A * | 5/1986 | Piasecki et al. | ............ | 244/17.13 |
| 4,923,144 A * | 5/1990 | Eickmann | ..................... | 244/7 C |
| 5,405,105 A * | 4/1995 | Kress | ............................. | 244/7 C |
| 5,419,514 A * | 5/1995 | Ducan | .......................... | 244/12.4 |
| 5,560,568 A * | 10/1996 | Schmittle | ........................ | 244/48 |
| 5,823,468 A * | 10/1998 | Bothe | ............................... | 244/2 |
| 5,941,478 A * | 8/1999 | Schmittle | ........................ | 244/48 |
| 6,138,943 A * | 10/2000 | Huang | .......................... | 244/7 C |
| 6,367,736 B1 * | 4/2002 | Pancotti | ........................ | 244/7 C |
| 6,607,161 B1 * | 8/2003 | Krysinski et al. | ............ | 244/7 C |
| 6,659,394 B1 * | 12/2003 | Shenk | ............................ | 244/7 C |
| 7,472,863 B2 * | 1/2009 | Pak | ................................ | 244/12.5 |
| 2005/0230519 A1 * | 10/2005 | Hurley | ........................ | 244/7 C |
| 2006/0226281 A1 * | 10/2006 | Walton | ........................ | 244/17.23 |
| 2008/0048065 A1 * | 2/2008 | Kuntz | .......................... | 244/17.23 |
| 2009/0008499 A1 * | 1/2009 | Shaw | .......................... | 244/17.23 |

* cited by examiner

*Primary Examiner* — Tien Dinh
*Assistant Examiner* — Steven Hawk
(74) *Attorney, Agent, or Firm* — Richard B. Cates

(57) ABSTRACT

The invention is a modular vehicle having an air vehicle that can be coupled to cargo containers, land vehicles, sea vehicles, medical transport modules, etc. In one embodiment the air vehicle has a plurality of propellers positioned around a main airframe, which can provide vertical thrust and/or horizontal thrust. The propellers are mounted on supports which have an airfoil shape to generate additional lift. One or more of the propellers may be configured to tilt forward, backward, and/or side-to-side with respect to the airframe.

19 Claims, 14 Drawing Sheets

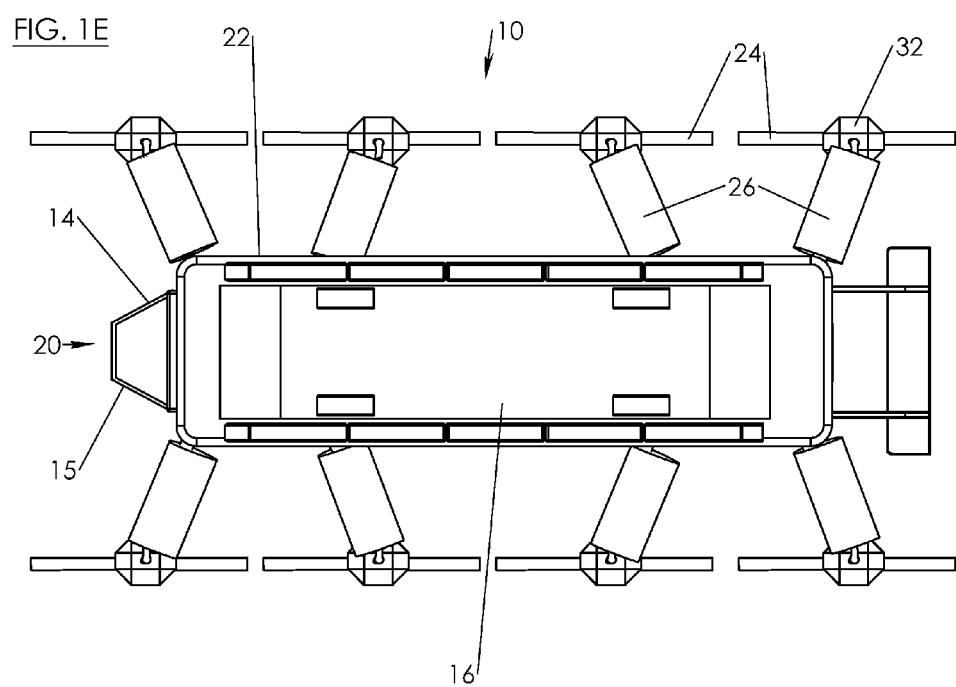

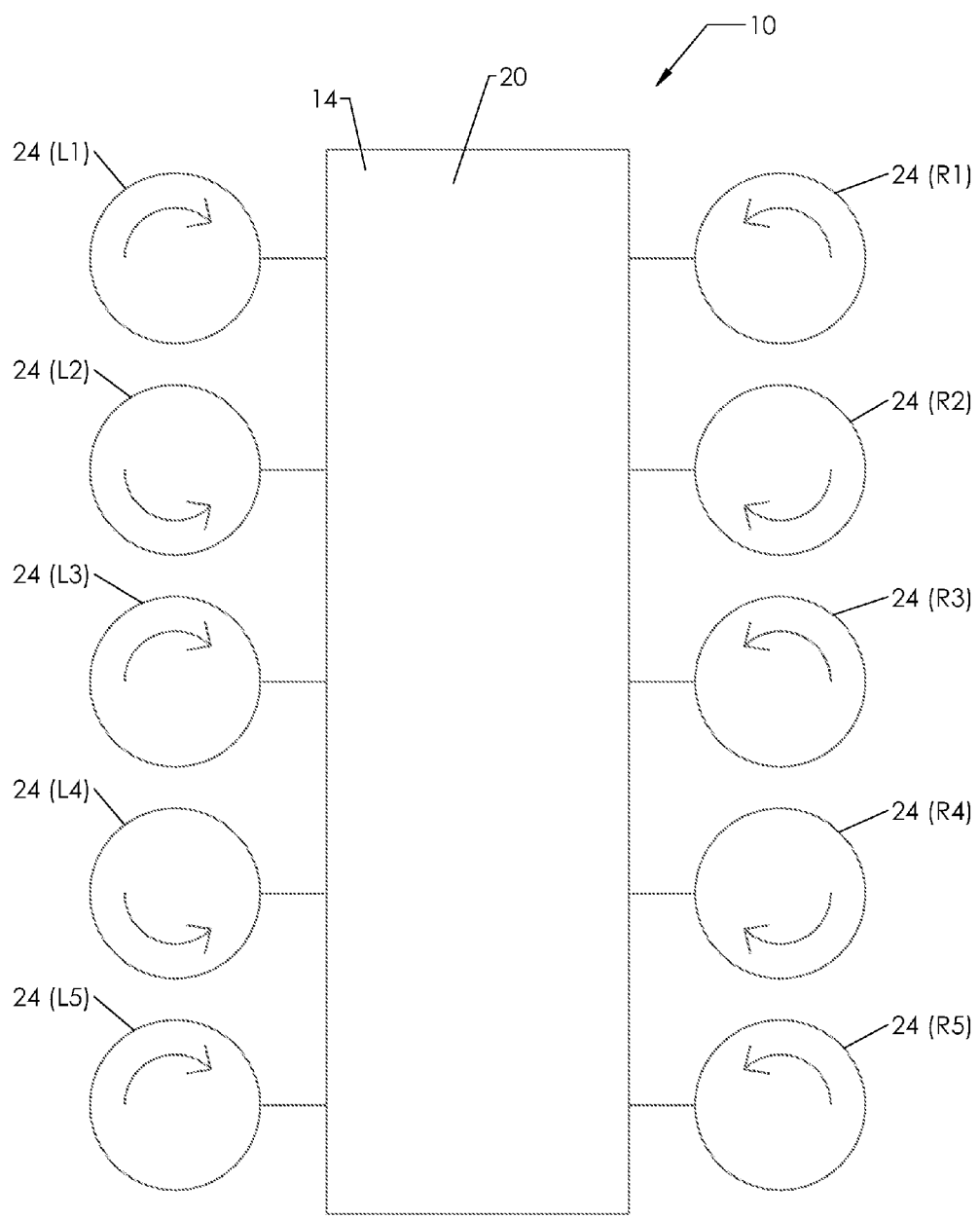

MODULAR FLIGHT VEHICLE WITH WINGS

RELATED APPLICATIONS

The present application claims priority from U.S. Provisional Patent Application No. 61/332,817, filed May 10, 2010 and entitled "Modular Flying Vehicle With Airfoil," the entire contents of which are incorporated herein by reference. The present application also relates to U.S. Provisional Patent Application No. 60/901,809, filed on Feb. 16, 2007, and to U.S. Utility patent application Ser. No. 12/070,669, filed Feb. 19, 2008, the entire contents of each of which are incorporated herein by reference.

FIELD OF THE INVENTION

The present invention relates to flight vehicles, and more particularly to flight vehicles configured to carry various payloads.

BACKGROUND OF THE INVENTION

Heavier-than-air flight vehicles have been known for that last 100 years or so, and include airplanes and helicopters. Such flight vehicles are used in many applications where speed is necessary to transport people and/or cargo to distant locations.

In many applications, it is desirable to transport people and/or materials to distant locations where the terrain is rugged and facilities may be lacking. For example, in many military applications troops and equipment must be delivered rapidly to intercept enemy troops. The use of flight vehicles is often the quickest method to transport such troops and equipment.

While airplanes have excellent lifting capacity and altitude capabilities, most airplanes lack vertical takeoff or landing (VTOL) or even short takeoff or landing (STOL) capabilities, and they typically require a large open space for takeoff and landing. In many rugged landing sites, airplanes are not suitable.

Helicopters can land and take off vertically, and have exceptional maneuverability. Helicopters are sometimes subject to accidents and failures, such as engine or rotor failures, which in some situations will lead to a failure and loss of the helicopter. Helicopters also use rotors (as opposed to propellers), which involve swash plates and other complicated mechanisms. Additionally, many helicopters have difficulty operating at high altitudes.

U.S. Utility patent application Ser. No. 12/070,669, filed Feb. 19, 2008 and entitled "Modular Flight Vehicle," the contents of which are expressly incorporated herein by reference, discloses a flight vehicle having multiple engines driving multiple propellers to provide a lift vehicle with improved flight characteristics and capabilities. The developments disclosed in the current application can be used in connection with the flight vehicle and other inventions disclosed in U.S. Utility patent application Ser. No. 12/070,669.

What has been needed is a vehicle that can be easily delivered and deployed for flight, with improved lift and other flight characteristics even at high altitudes, that is adaptable to many uses. The current invention meets those needs.

SUMMARY OF THE INVENTION

The invention is a modular vehicle including an air vehicle and one or more payloads, such as ground vehicles, cargo containers, etc. The vehicle may be able to fly, set down and drive on land, and/or set down and cruise on or in water while also having vertical takeoff and landing (VTOL) or short takeoff and landing capabilities (STOL).

Embodiments of the present invention include a flight vehicle having a main airframe defining an airframe plane, a plurality of propellers extending on supports from the main airframe, with at least one propeller of the first propeller subset of the plurality of the propellers having a forward tilt angle from the airframe plane with respect to the airframe front of about +15 to −15 degrees, or about zero degrees, and with a second propeller subset including at least one propeller having a forward tilt angle from the airframe plane of between 60 and 95 degrees, or about 90 degrees. One or more propellers of the second propeller subset may be configured to be tilted forward from a zero tilt angle to a 90 degree tilt angle. One or more of the propellers may be configured to vary in height relative to the airframe.

A flight vehicle can include a propeller/engine assembly held to a support arm by a holder configured to permit the propeller/engine assembly to tilt away from or toward the airframe forward axis. The propeller/engine assembly holder may permit the propeller/engine assembly to tilt away from or toward the airframe longitudinal axis responsive to a moment applied to the propeller/engine assembly by rotation of the propeller, such as may be caused by uneven lifting forces on an advancing vs. retreating propeller blade with respect to the direction of flight. A restraining mechanism, such as shock absorber or active tilt mechanism (such as an electric motor), may be included to oppose, effectuate, or otherwise control the sideways tilt of the propeller engine assembly. The flight vehicle may include a tilt mechanism configured to effectuate tilt of the propeller/motor assembly away from or toward the airframe forward axis.

The invention includes a method of operating a flight vehicle having a plurality of propellers and an airframe, involving positioning each of the plurality of propellers with a tilt angle of approximately zero with respect to the airframe plane; providing power to all of the plurality of motors, wherein the power is sufficient to lift the air vehicle off of the ground so the vehicle is airborne; with the vehicle airborne, maintaining or increasing power to a first propeller subset comprising one or more of the plurality of motors; with the vehicle airborne, reducing power to a second propeller subset comprising one or more of the plurality of motors, while simultaneously; with power reduced or eliminated to the second propeller subset, tilting one or more of the propellers of the second propeller subset forward with respect to the airframe front to a tilt angle of between 60 and 95 degrees; and with the one or more of the propellers of the second propeller subset tilted forward with respect to the airframe front to a tilt angle of between 60 and 95 degrees, increasing power to the second propeller subset. After increasing power to the second propeller subset while tilted forward, power may be reduced and even eliminated to one or more propellers of the first propeller subset.

The propellers of the first subset of propellers may be positioned generally adjacent the airframe front and airframe back, and the propellers of the second subset of propellers may be positioned generally between the first subset of propellers and/or between the airframe front and airframe back. The heights of one or more of the propellers, including first and/or second subsets, may be varied, either on the ground or during flight.

The vehicle is configured to be folded into a more compact form for storage and/or transport. The vehicle can be delivered to a desired location via truck, ship, aircraft, etc., and can be deployed quickly for use. In an embodiment of the invention, the propellers are held on propeller supports extending from the airframe. The propeller supports can extend from the airframe at various angles and lengths, and can be configured to swing or otherwise move away from the airframe to a deployed (flight) configuration and back to a stowed (storage) configuration where the propeller supports and associated propellers (potentially including the engines) are stowed against and/or inside the airframe. Vertically standing pivot arms may used for stowing and deploying the propeller supports, which may be a triangular, cantilever, or other type of extension used to support the engines from the airframe center section during flight. Electric motors, possibly including an electric clocking system, may used to properly position the propellers for storage.

The rotating engine support arms can rotate either from actuators or gears etc and even manual means from ground units or personnel. The arms lock with mechanisms either stowed or deployed but a safety feature can also make the arm lift up or out of the way or even have the engine drop off in an emergency which allows for another engine to rotate into that area and counter that asymmetrical thrust.

The rotating engine support arms may be configured with specific shapes to enhance the lift created thereby. For example, in one embodiment the engine support arm comprises a generally cylindrical core cylinder surrounded by and supporting a wing structure, such as a wing having a generally thick camber, generally short chord, and a generally symmetrical cross-sectional shape (i.e., generally symmetrical with respect to the chord line). The wing portion of the engine support arm may be configured to rotate (independently from the engine support arm or in conjunction therewith) about a rotational axis passing through the length of the engine support arm.

All or part of the vehicle can drive or fly or float, etc. The vehicle can include different modular components. One component may provide flight capability, while another component may provide driving or maneuverability on the ground or water, etc. The components can fly, drive, or float, etc. either together or as individual pieces One embodiment of a ground vehicle includes a snow-cat type of adaptation including a treaded track and/or skis. Wheels and floats could also be applied to various components of the invention.

An air vehicle according to an embodiment of the invention includes a plurality of propellers extending from a main airframe. The air vehicle has vertical takeoff and landing (VTOL) as well as short takeoff and landing (STOL) capabilities. The air vehicle may have the ability to have its propellers swing into a stowed position that makes a tightly compact vehicle that can fit into an aircraft (such as a military C-5 cargo plane), ship, or other transport vehicle. The air vehicle propellers may be configured to rotate (manually or automatically) or otherwise extend outwardly to a deployed (flight) position, whereby the propellers are in position to lift the air vehicle off the ground for flight.

The propellers of the invention may be ducted fans, shrouded propellers, bladed propellers, or other propeller assemblies. A bladed propeller may include any number of blades, depending on the particular application. The engines can be attached directly to or even be internal of the airframe with a drive to each propeller, or the engines to each propeller can be adjacent to and/or even directly connected to the propeller on the propeller support arms. The propeller can be directly secured to the engine via a rigid and fixed drive shaft without clutch or other similar mechanism, so that the propeller RPMs will be the same as the engine RPMs. The propeller/engine assembly may include a clutch, such that the propeller can remain still while the engine is running (i.e., at idle, etc.). The propellers can be variable-pitch propellers, such as electric variable-pitch propellers for atmospheric density changes, etc.

The propellers (possibly including attached engines and drive shafts) may be configured to cant front-to-back and/or side-to-side in order to either turn the vehicle in the yaw axis, counter asymmetrical thrust in case of an engine out condition, tilt the aircraft in the air so that the main fuselage can remain more level, etc. The propellers may be tilted in or opposite the direction of motion of the vehicle. The propeller support arms can be telescoping to allow for various propeller sized and/or for repositioning of a propeller.

A vehicle according to the invention could be launched in various methods. The vehicle could launch in a STOL or VTOL technique from land or sea, or from platforms (such as buildings, movable platforms, or ships) on land or sea. The vehicle could include a parachute and/or parafoil or similar device secured to the airframe in order to be launched and/or delivered via air dropping (e.g., from a cargo plane such as a military C-5 or C-130). A drogue chute could stabilize the fall, the engines could start to idle as the drogue chute is retrieved via a mechanism, and the engines could then start to apply full power as the drogue chute is retrieved. The vehicle could also be dropped with just a streamer to stabilize the vehicle, and then start the motors once stability is achieved. Even a freefall with no decelerator may work, with the propellers themselves providing stability and slowing the fall of the vehicle until the engines are fully started. The vehicle could also include an emergency parachute or similar device to be deployed in case of an emergency, such as loss of power to all engines. The emergency parachute could be deployed using an explosive device that throws the parachute into a deployed configuration. A so-called ballistic parachute could be used as an emergency parachute.

The vehicle could be configured for delivery or even launch from a torpedo tube. For example, the diameter of a submarine missile tube is between 6' and 7' in diameter and 28 feet long, and a version of this vehicle can fit in the missile tube and fold away safely for special missions.

The air vehicle may be configured with interchangeable components, including engines, propellers, and corresponding supports. This allows different components to be exchanged in a relatively rapid fashion for repairs and/or different performance requirements. For example, a set of short propellers could be used for applications where rapid acceleration and high speed were desired for the air vehicle, with a set of longer propellers replacing the shorter propellers for use in applications where high lift and high altitude performance are desired for the air vehicle.

Large multi-engine versions can be made, with each propeller driven by not just one but several engines. The added engines not only allow for additional thrust but can also provide redundancy in case of engine loss/failure. The engines can be diesel, (including turbodiesel), electric, hybrid, hydrogen, and other fuel burning motors that turn the propellers sufficiently to propel the aircraft with the payload through the air with good performance.

The air vehicle could be configured to connect with and lift a portable medical treatment facility, such as the LSTAT used by the US Army which is an enlarged medical litter that is essentially a small ICU configured to hold not just a patient but also medical equipment and medical personnel. Such a portable medical treatment facility could fit inside and/or be secured underneath (or to another portion of) an air vehicle of the invention. The air vehicle could be configured to accommodate the medical personnel inside the cockpit of the air vehicle, but still provide access to and from the portable medical treatment facility from the cockpit.

The vehicle may include lifting assemblies for lifting items from the ground/water/etc. up to and airborne vehicle. In one such embodiment, a litter or net-like device is used to lift items up to the vehicle. The net may have a relatively rigid frame or be more sling-like, depending on the particular application.

The vehicle can include external payloads in various forms. External drop tanks can be configured to carry fuel for the air vehicle (or for delivery to offsite location). Reserve fuel tanks can be located just above the drop fuel tanks for emergency flight if any of the engines quit or is damaged during the flight. Quick fuel dumps can also be done without losing the fuel tanks. The reserve tank would still contain enough fuel to fly to a safe location for landing. The drop tanks are below the reserve tanks since they may have to drop during flight. They can be located almost anywhere on the vehicle including portions of the ground vehicle portion and/or the air vehicle portion, such as within the fuselage, within the support structure, within the support arms/airfoils, and/or by the engines themselves. If the engines are internal to the aircraft, the fuel can also be there. To facilitate mating the flight vehicle portion to the ground vehicle portion, the fuel tanks may be placed on the lower sections and outside sections of the vehicle, where the ground wheels will not affect their placement.

The air vehicle can be controlled by an onboard pilot or computer system, or can be remotely controlled via computer and/or remote-located pilot. Traditional helicopter controls can be used in the interior of the vehicle for use by an operator along with the autonomous flight controls. There can be a collective and stick as with existing helicopters to give control of the vehicle to an operator when needed. Note that the air vehicle can be remotely controlled, directly controlled from within the cockpit, or controlled by the autopilot. A satellite link through Iridium and others may be useful.

The vehicle can be used to transport goods/supplies and/or personnel. The vehicle may be particularly useful for evacuating injured individuals from remote areas, with such evacuations achieved via an on-board human pilot, remotely-located human pilot, remotely located computer, on-board autopilot, or a combination thereof.

The air vehicle will typically have advanced electronics and computer controls to maintain stability of the vehicle in flight. Such advanced controls can be of particular importance in controlling and adjusting the power from the large numbers of propellers and engines that may be involved. Many such control systems are already known in the art for use with helicopters and other flight vehicles. Modern aircraft navigation systems can work well with this vehicle. A neural net computer system may be employed. Vehicle stability can be provided by gyros located, e.g., on the centerline between engines that goes through the center of gravity of the vehicle when it is empty. Gyros can be used on a centerline from the empty vehicle center of gravity and even from the full vehicle center of gravity, depending on the particular needs. At least one gyro per axis may be preferred, although at times only one gyro may be used depending on the size and complexity of the vehicle. The gyro stabilization may be at least 70 cycles per second for updates to the throttles to each engine, etc. In addition to gyros for stability, an attitude heading reference system (AHRS) may be used to further stabilize the vehicle.

Navigation systems can include GPS systems and other modern navigation methods. An autopilot can be used, including many of the helicopter-type state of the art autopilots currently available, such as a Piccolo 2 series autopilot when interfaced with neural net computer software like the one that the Naval Research Laboratory has developed for their SPIDER Helicopter. In addition to other navigation systems, an obstacle avoidance system such as a scanning laser system may be employed to find obstacles in the air vehicle flight path. Difficult-to-spot obstacles such as power lines, etc. may be located using map data, etc. Other aircraft can be avoided through the use of transponder information, by receiving secure data by friendly aircraft as to where they are by GPS coordinates, etc.

Vehicle sizes range from very small (e.g., nanorobot size) to very large. This vehicle can also be a toy that is sold to consumers. The larger versions may be configured to lift very large payloads, including tanks, and also to be driven on highways when on the ground.

In one embodiment of the invention, an air vehicle has a main airframe which defines an airframe horizontal plane and has an airframe front, airframe back, airframe left side, and airframe right side. The air vehicle may have at least four propeller supports extending from the main airframe, with each propeller support having a proximal end, a distal end, and an elongated main support body between the proximal end and the distal end, wherein the elongated main support body comprises a longitudinal axis, wherein the proximal end is secured to the main airframe and the elongated main support extends sideways from the main airframe. At least two propeller supports may be positioned with their distal ends to the left of the airframe left side, and at least two propeller supports may be positioned with the their distal ends to the right of the airframe right side. At least four propellers may be positioned at the distal end of each propeller support. At least four movable airfoils may be positioned on a corresponding propeller support, each airfoil having a leading edge, a trailing edge, a span, and a chord line. The span of each movable airfoil may be positioned substantially parallel to the longitudinal axis of the elongated main support body of the corresponding propeller support, and the movable airfoil may be configured to be rotated about the airfoil rotational axis. The airfoil rotational axis can be substantially parallel to the longitudinal axis of the elongated main support body, and each movable airfoil may be configured to rotate from a first position wherein the chord line is substantially non-parallel or even substantially perpendicular to the airframe horizontal plane and the trailing edge is positioned below the leading edge, to a second position wherein the chord line is substantially parallel to the airframe horizontal plane and the trailing edge is positioned behind the leading edge. Each airfoil may have a center of lift, and the airfoil rotational axis may be positioned substantially at the airfoil center of lift. Each airfoil may be configured to freely rotate through at least 30 degrees, 90 degrees, or even through several complete rotations about the airfoil rotational axis. The airfoils may be generally symmetrical airfoils. The airfoils may be relatively short with thick camber, and may define a thickness and a chord length wherein the airfoil has a maximum thickness which is at least 20 percent, at least 25 percent, at least 30 percent, or even more of the measured length of the airfoil chord.

An air vehicle according to the invention may be configured to generate sufficient thrust, using only the propellers, to lift the air vehicle vertically off of the ground. The propellers of such an embodiment would, when powered by one or more appropriate engines, generate a combined thrust at least as large as the total vehicle weight an air vehicle weight, wherein the air vehicle weight is the combined weight of all components of the air vehicle.

A method of operating an air vehicle according to an embodiment of the invention may include positioning the air vehicle on a takeoff surface, positioning each movable airfoil in the vertical flight position, and rotating the propellers to generate sufficient propeller thrust to lift the vehicle substantially vertically off the takeoff surface, whereby the vehicle lifts from the takeoff surface. Each movable airfoil may freely rotate to the takeoff position, and positioning each movable airfoil in the vertical flight position may include rotating the propellers to generate sufficient airflow to cause each movable airfoil to rotate to the takeoff position. The airfoils could be rotated to control the direction and/or the position of the air vehicle in vertical and/or takeoff and/or forward flight. The air vehicle may include a horizontal thrust generator configured to provide horizontal thrust, with the method involving activating the horizontal thrust generator to provide horizontal thrust in a forward direction, and positioning each movable airfoil in the forward flight position.

One or more of the propellers may be a tilting propeller configured to be tilted forward or backward with respect to the air vehicle horizontal plane, with such tilting propellers being or augmenting the horizontal thrust generator. Activating the horizontal thrust generator can include tilting the tilting propeller forward with respect to the air vehicle horizontal axis.

Each movable airfoil may configured to be rotated to a STOL (short takeoff and landing) position where the trailing edge is below and behind the leading edge and the chord line is at an angle between 15 and 75 degrees from the air vehicle horizontal plane. For STOL operation, the air vehicle can be positioned on a takeoff surface (such as ground or water), each movable airfoil can be moved to the STOL position, and the propellers can be rotated to generate sufficient propeller thrust to move the air vehicle forward and into the air. Two or more of the propellers may be tilting propellers configured to be positioned with a forward tilt angle of at least 15 degrees with respect to the air vehicle horizontal plane, wherein takeoff can include positioning the tilting propellers with a forward tilt angle of at least 15 degrees with respect to the air vehicle horizontal plane.

A flight vehicle according to a further embodiment of the invention has a main airframe, the airframe defining an airframe horizontal plane and having an airframe front, airframe back, airframe left side, and airframe right side. The vehicle may include four or more propeller supports extending from the main airframe, wherein each propeller support comprises a proximal end, a distal end, and a generally straight elongated main support body between the proximal end and the distal end, wherein the elongated main support body comprises a support body longitudinal axis, wherein the proximal end is secured to the main airframe and the elongated main support extends sideways from the main airframe, wherein at least two propeller supports are positioned with the distal ends thereof to the left of the airframe left side, and at least two propeller supports are positioned with the distal ends thereof to the right of the airframe right side. The propeller supports may be configured to swing against and away from the airframe, with the supports rotating about a support rotational axis which may be substantially perpendicular to the airframe horizontal plane. In this way each of the at least four propeller supports can be rotated from a stowed position wherein the distal end thereof (and corresponding propeller) is substantially adjacent the airframe to a deployed position wherein the distal end thereof (and corresponding propeller) is substantially displaced sideways from the airframe.

Each airfoil may have a center of lift, and the airfoil rotational axis may be positioned substantially at the airfoil center of lift. The airfoil rotational axis may be generally aligned with the support body longitudinal axis. The airfoil may be able to rotate freely through a selected range of degrees about its rotational axis. The airfoil rotation may also be controlled via an actuator, brake, electric motor, etc.

Due to issues with currently available vertical lift vehicles, a need exists for a vertical lift vehicle that has improved lift characteristics, reduced cost, and increased reliability. The present invention addresses these needs.

BRIEF DESCRIPTION OF THE DRAWINGS

FIGS. 1A-1G are front perspective, rear perspective, side, top, bottom, front, and rear views, respectively, of an air vehicle according to an embodiment of the invention;

FIG. 6 is a top view of an air vehicle with propellers, with indications of directions of rotation according to an embodiment of the invention;

DETAILED DESCRIPTION OF PREFERRED EMBODIMENTS

Figure 1A:
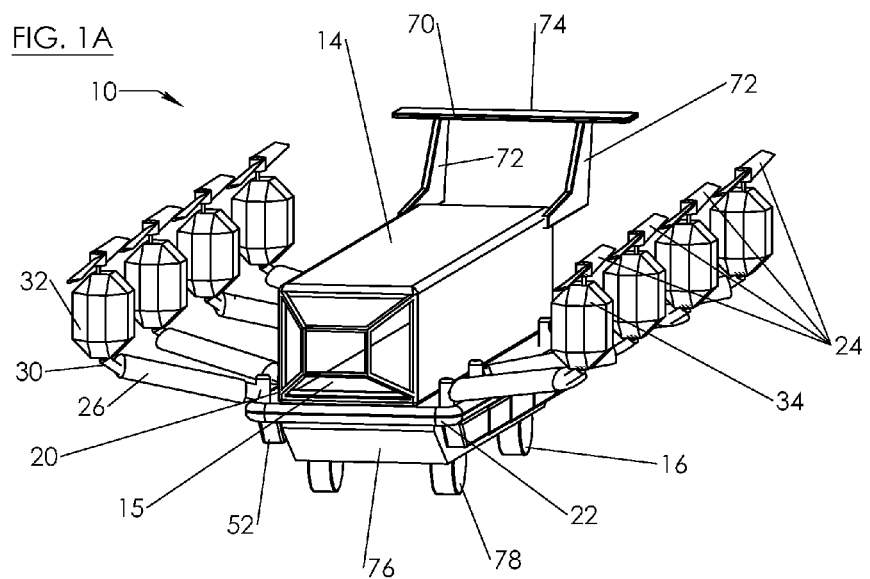
Figure 1B:
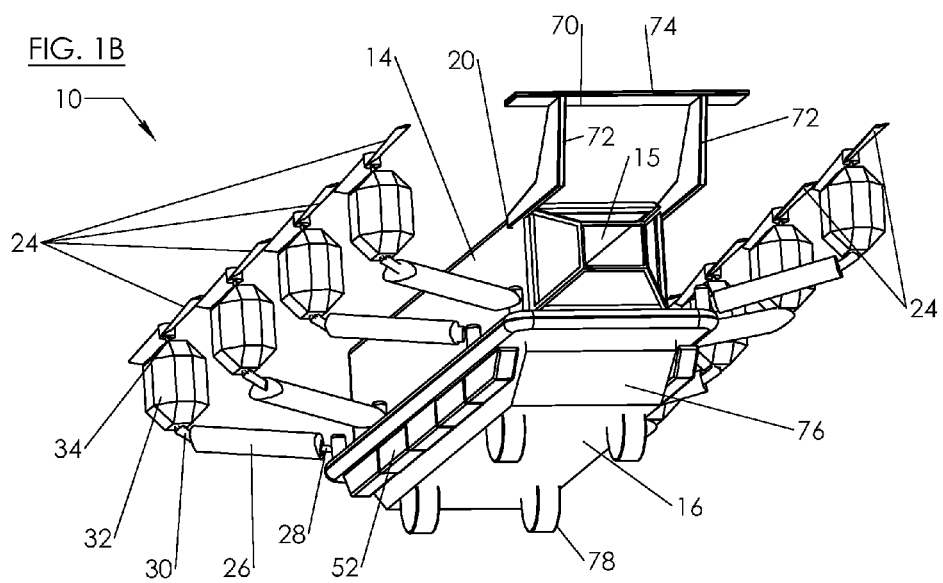
Figure 1C:
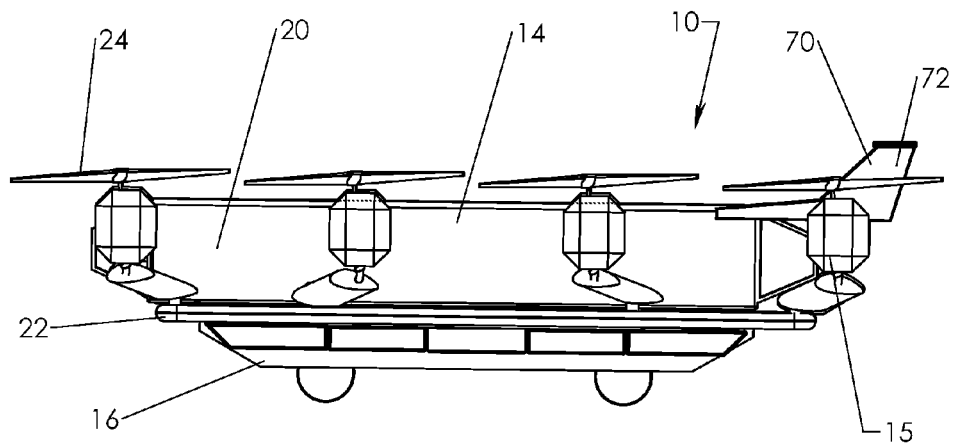

FIGS. 1A-1G depict an air vehicle 10 according to an embodiment of the invention. The air vehicle 12 includes a ground vehicle portion 16 and a flight vehicle portion 20. The flight vehicle portion 20 includes a fuselage 14 supported by a main support frame 22 having a forward axis passing through its middle in back-to-front fashion. The fuselage 14 includes front and rear canopies 15, which in the particular embodiment depicted are transparent for visibility by person (s) who may be inside the fuselage. Eight (8) propellers 24 (represented by discs representing the diameter of the circle defined by a spinning propeller) extend from the support frame 22 on propeller supports 26. Each propeller support 26 has a proximal end 28 secured to the main support frame 22, and a distal end 30. In one embodiment, each propeller support is about 6 feet in length. In the particular embodiment depicted, each propeller 24 is linked to and individually powered by a devoted engine 32, with a linked propeller 24 and engine 32 forming an engine-propeller assembly 34. One engine-propeller assembly 34 is positioned at the distal end 30 of each propeller support 26. Note that the engine-propeller assemblies for use with the invention may have different configurations, depending on the particular application. For example, one or more engines could be positioned within the vehicle 10 itself (e.g., the ground vehicle portion 16 or flight vehicle portion 20), with the engine providing power via gear/shaft linkage, hydraulically, electrically, etc. via the support arm supporting the propeller. While the embodiment depicted has a dedicate engine for each propeller, in other embodiments one engine could power several propellers; or one engine could be the primary driver for one or more propellers and the backup driver for one or more other propellers; or a propeller could be powered by multiple engines; etc. In one embodiment wherein each propeller has its own engine, each of the engines 32 provides about 110, 140, or more horsepower, with each engine 32 driving a propeller 24 having an overall length of about 7-9 feet. The propellers 24 may be configured to be easily removed and replaced, either with identical propellers or with different types of propellers, such as propellers which are longer or shorter, etc.

Figure 1D:
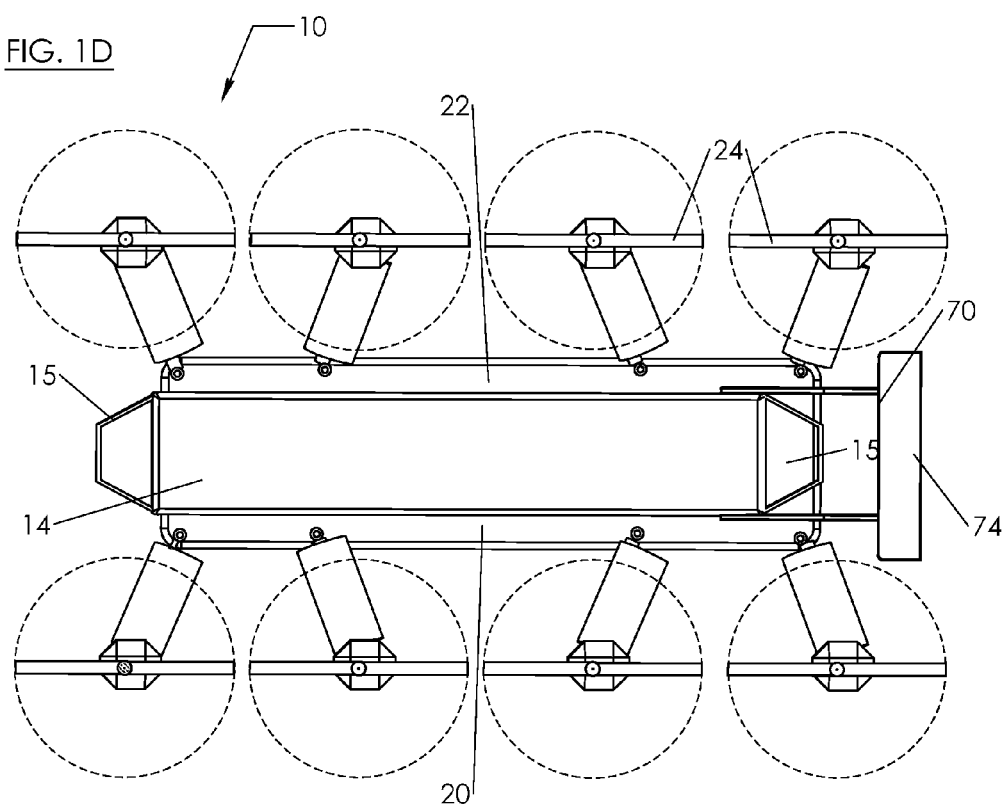

As shown most clearly in the top view of FIG. 1D, the propellers 24 are spaced around the main support frame 22, with four of the propellers 24 extending from each side of the support frame front. Different propellers 24 of the flight vehicle portion 20 can rotate in different directions, depending on the particular application and including such variables as the spacing of the propellers, the total number of propellers on a particular air vehicle, and other characteristics of a particular air vehicle, including the engines and propellers thereof. For example, the propellers 24 extending from the airframe left side 40 may have a rotational direction in a generally counterclockwise fashion when viewed from above, while the propellers 24 extending from the airframe right side 42 may have a rotational direction in a generally clockwise fashion when viewed from above. With such rotations, the blades of each propeller 24 are in a forward motion with respect to the flight vehicle portion 20 when they are closest to the airframe 22, and are in a backward motion with respect to the flight vehicle portion 20 when they are furthest away from the airframe 22. Note that other rotation patterns are also within the scope of the invention, including those discussed below and depicted in FIG. 6. For example, adjacent propellers along each side of the vehicle may rotate in opposing directions, similar to the egg-beater style opposing rotation of the helicopter blades of a two-propeller Chinook helicopter.

The propellers 24 are positioned generally aligned in an air vehicle horizontal plane adjacent the airframe top, and may be tilted slightly forward from the air vehicle horizontal plane by a forward tilt angle, such as a forward tilt angle of zero to 5 degrees, with 3 degrees being appropriate for some applications. The forward tilt angle 50 of each propeller 24 can vary (including variations from propeller to propeller), depending on the particular embodiment. In one embodiment, propellers 24 are generally fixed at a forward tilting angle 50 of about zero to 5 degrees. In another embodiment, the propellers 24 can be selectively rotated in flight (using a mechanical tilting mechanism such as a hydraulic, electric, or other device or assembly) through various tilt angles, including from horizontal to forward by about 90 degrees or even backward by up to about 90 degrees (i.e., a forward tilt angle 50 of −90 degrees). In other embodiment, some of the propellers have very small forward, or even zero, forward tilt angles, while other propellers are tilted forward at much greater angles.

Note that an air vehicle horizontal plane is defined as a plane passing through the air vehicle in a generally horizontal manner with respect to the air vehicle, i.e., horizontal when the air vehicle is on the ground and/or when in a level configuration (e.g., in purely vertical flight mode).

Figure 1F:
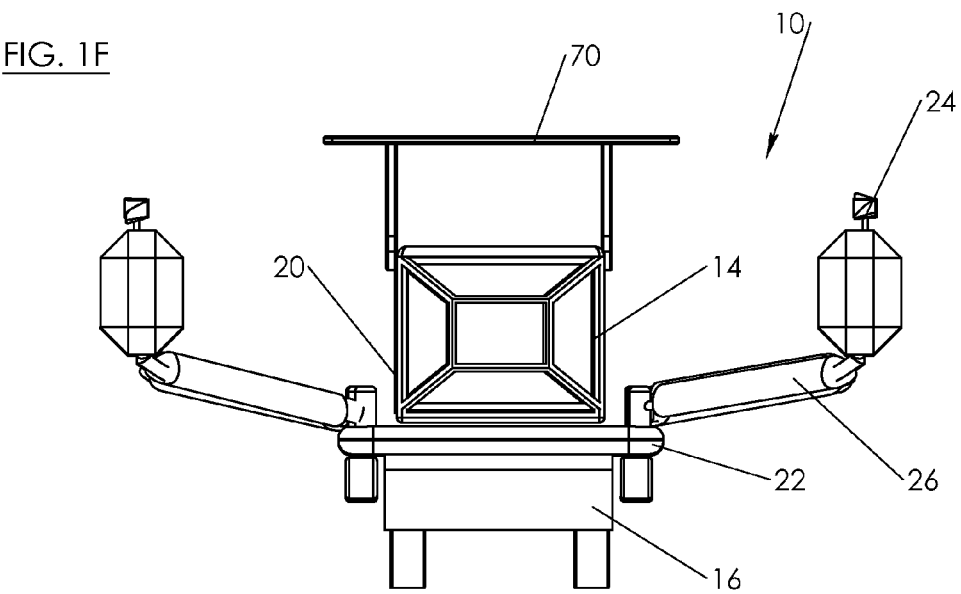
Figure 1G:
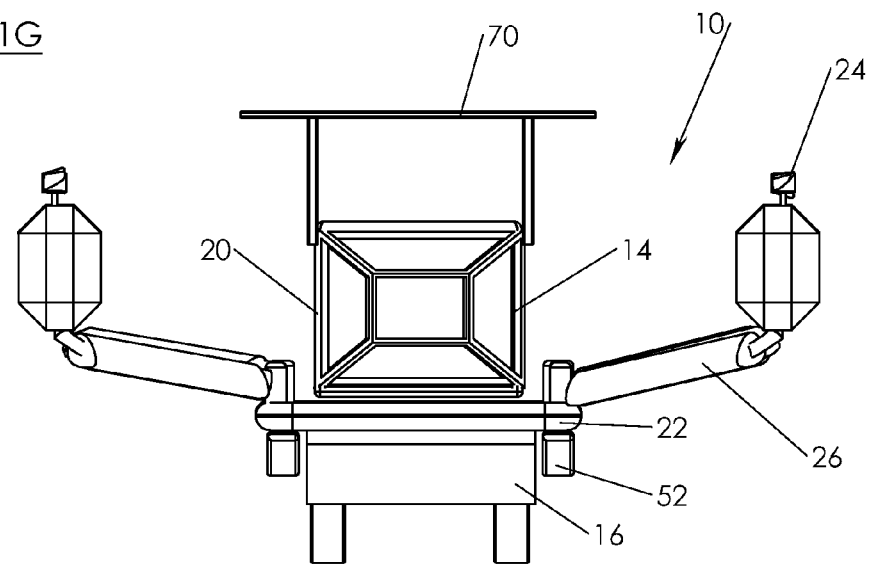

In the embodiment seen most clearly in FIG. 1F, the support arms 26 are secured to the flight vehicle portion 20 at their proximal ends 28 at a rotational hinge-like structure about which the support arms may pivot away from and against the flight vehicle portion 20, as depicted in FIGS. 3A-3D. Note that other mechanisms and methods for securing the support arms 26 and/or propellers 24 and/or engines 32 to the vehicle 10 are also within the scope of the invention. For example, one or more support arms 26 could be formed using a so-called four bar linkage assembly to provide movable support for the propeller 24. The deployment and/or retraction of the support arms and/or propellers could be achieved via an actuator configured to rotate or otherwise deploy the propeller outwardly away from, and retract back toward, the vehicle 10.

In the embodiments of FIG. 1F and FIGS. 3A-3D the support arm 26 is inclined at an upward angle from its proximal end 28 to its distal end 30, which positions the engine and propeller assemblies at a greater height with respect to the vehicle than the pivot point and proximal end 28 of the support arm. Another result of this upward inclination is that the airfoils on the support arms of each side form a dihedral angled formation, which can increase the stability of the vehicle 10 when in flight. In the embodiments of FIG. 1F and FIGS. 3A-3D, the angle of inclination essentially the same when deployed as when stowed. However, in other embodiments the support arm may have an angle of inclination which varies between the stowed position and the deployed position. For example, a pivot assembly could be constructed using known methods and assemblies wherein the support arm is generally horizontal when stowed, but the support arm is inclined upward (or downward) from proximal to distal end when the support arm is deployed to position the propeller away from the vehicle.

The vehicle may include one or more dampers, such as dampers on the support arm, engine/propeller assemblies, etc. to reduce unwanted vibrations, to permit the engine/propeller assemblies to pivot, etc.

Extending from the bottom of the main support frame 22 are landing supports 52 configured to support the weight of the flight vehicle portion 20 when it is resting on the ground separately from the ground vehicle portion 16. In the particular embodiment depicted, the landing supports 52 are simple skids. The landing supports 52 may alternatively be wheels which may be powered and/or steerable, or may be free moving, depending on the particular application. In other embodiments, the flight vehicle portion 20 may include floats for landing on and/or cruising in a boat-like fashion on water, skis for landing on and/or cruising on snow and/or ice, or other assemblies for landing and/or traveling on various surfaces. The landing supports 52 may, depending on the particular embodiment, be retractable and extendable for, e.g., flight and landing modes of operation. In the particular embodiment of FIGS. 1A-1G, the landing skids 52 may include one or more fuel tanks and/or fuel bladders therein, or may be replaced entirely by fuel tanks.

Depending on the particular embodiment, the landing supports may have sufficient height when deployed to permit a ground vehicle to be driven under the main airframe. The landing supports may be extendable and/or retractable, and may be configured to telescope in length and/or to swing or otherwise extend outward from the main support frame and/or fuselage and/or other portion of the flight vehicle portion. In some embodiments, the landing supports may include hydraulic, electric, and/or other extending mechanisms to extend, retract, and/or otherwise reposition the landing supports, and such extending mechanisms may have sufficient lifting capacity to lift the flight vehicle portion, when on the ground, from a relatively low height (such as may be desirable to directly load the air vehicle portion, such as through the rear door thereof), to a height sufficient for a ground vehicle to be driven thereunder.

Landing supports can also be secured to the engine/propeller supports and/or to the engine/propeller assemblies. For example, engine/propeller assemblies could include wheels, floats, etc. extending beneath them to provide increased stability in situations where an engine/propeller assembly might contact the ground, such as where the air vehicle is landing on uneven terrain and/or water. Such landing supports on the engine/propeller assemblies and/or supports could also facilitate movement of the engine/propeller assemblies and/or supports when detached from the air vehicle, such as where such assemblies are being replaced or repaired.

A cockpit may be positioned in the front of the fuselage 14, from which a pilot can control the flight vehicle portion 20 in flight and on the ground. The cockpit may have a cover/windshield (such as one of the canopies 15) configured to swing outwardly open to act as a door through which the crew can access the vehicle. The fuselage 14 may include a rear door, which may open by lowering and forming a ramp for loading materials in the flight vehicle portion 20.

In the embodiment of FIGS. 1A-1G, the propellers 24 are directly powered by engines 32 directly secured thereto by simple drive shafts. However, various engines and engine assemblies can be used with the invention. The engines can be mounted at the end of supports along with propellers, as in the embodiment of FIGS. 1A-1G, or the engine or engines can be mounted elsewhere (such as in or on the main airframe) and connected to the propellers via a drive shaft assembly.

In the embodiment of FIGS. 1A-1G, the engine supports 26 are secured to the main support frame 22, and extend outwardly therefrom at a slight upward angle to support the engines 32 and propellers 24. In alternative embodiments, the engine supports 26 could be secured (at their proximal ends 28) to, and extend from, the top of the fuselage 14 or another structure to position the engine supports 26 (and their associated wings) at a greater height above the bottom of the flight vehicle portion 20. Such an embodiment may have the added benefit of positioning the propellers and engines at a greater height above the ground when the air vehicle 10 was on the ground, which may enhance the ability of personnel to approach and access the air vehicle 10 during ground operations. In further embodiments the engine supports may extend generally horizontally from the fuselage, and/or at a downward angle therefrom. Mounting the engines and propellers lower with respect to the fuselage (i.e., in plane with the aircraft center of gravity CG) may provide improved flight characteristics, such as improved maneuverability and/or stability, for the aircraft.

The vehicle may have one or more wings extending from the lower portions of the flight vehicle portion. For example, in an embodiment wherein the support arms extend from the top of the fuselage, the support arms may be positioned too close to the propellers to make effective supports for air foils. Air foils in such positions might interfere with the downwash from the propellers, etc. In such an embodiment, one or more wings could be added at lower portions of the vehicle. For example, multiple wings (or a single large wing) could extend from either side of the main support frame and/or bottom of the fuselage, thus positioning the wings well below the propellers. Such wings could be configured as in the embodiment depicted in FIGS. 2A and 2B, such that the airfoils can rotate to reduce drag depending on the direction of airflow (e.g., vertical takeoff mode and forward flight mode).

The specific engine type and power to be used depends on the particular application, including the air vehicle size, number and size of propellers, desired flight characteristics such as lift and speed, etc. In one version of an air vehicle according to the invention, such as an air vehicle configured for transport in a C-130 cargo airplane, the engines are Meyer nutating, Hirth 2-cycle, Thielert 4-cycle, turbo diesel, or similar engines, including engines that burn jet, diesel, heavy fuel, and/or gasoline and can each provide 110 to 150 horsepower or even up to 450 horsepower. Such engines can be linked to propellers having lengths of 7 feet to 21 feet. Other sizes and configurations are also within the scope of the invention, including very large vehicles with lifting capacities of 100,000 lbs using 4000 horsepower turbine engines driving 80 foot propellers or rotors.

Alternate methods of power are also within the scope of the invention. For example, the propellers could be directly powered by electric motors, with electricity provided by batteries and/or solar cells. Electricity could also be provided by a conventional engine that consumes fuel (e.g., gas, diesel, jet fuel, hydrogen, etc.) and acts as a generator to provide electricity to the electric motors and/or batteries in a so-called "hybrid" arrangement. In a configuration using electric motors, during flight some of the propellers may not need to be powered and the power thereto can be disconnected. Moreover, these unpowered propellers may begin to autorotate, particularly when the vehicle is in forward flight. Such autorotation of a propeller or propellers could cause a corresponding turning of the corresponding electric motor(s), and this turning of the electric motor could be used to act as a generator, thereby generating electricity which could be fed into the batteries and/or into the other electric motors.

The particular embodiment depicted includes a tail section 70 including vertical supports 72 (which may function as vertical stabilizers, and may include trailing flap assemblies to enhance such a function) as well as a horizontal stabilizer 74 (which may be able to rotate about an axis extending along its side-to-side width, and/or may include a controllable flap at its trailing edge).

The ground vehicle portion 16 includes a main ground vehicle body 76 and wheels 78. The ground vehicle portion 16 may be detachable from the flight vehicle portion 20 to operate in a separate and autonomous mode from the flight vehicle portion 20, so that the ground vehicle portion 16 can be detached and driven on the ground separately from the flight vehicle portion 20. In such an embodiment, the ground vehicle portion 16 may have an entirely independent power source for its propulsion, and/or may relay in part on the flight vehicle portion 20 for power. For example, in one embodiment of the invention the ground vehicle portion 16 is powered by internal batteries (not shown) which can be charged (e.g., during flight phase) by the engines of the flight vehicle portion 20. In an alternative embodiment, the ground vehicle 16 may be an integral part of the overall air vehicle 10.

In a particular example of an embodiment of the invention, the air vehicle and components thereof have the following dimensions and characteristics:

Propeller diameter: 9 feet. One or more propellers can be two-bladed, or can have three blades or more. The propellers are positioned at a height of about 12 inches above the top of the fuselage.

Propeller arms: 6 feet long, with a central support cylinder/tube of about 6 inches in diameter, and a surrounding wing structure having a maximum thickness of about 9 inches, and a length (chord) of about 2 feet. The surrounding wing structure may define a wing cross section which is relatively short in chord length, relatively thick, and with a generally symmetrical airfoil shape in cross-section.

Support frame: about ⅔ foot thick, 26-27 feet long, about 8 feet wide.

Fuselage: about 30 feet long, 5 feet wide, 4.5 feet high. (Note that the fuselage itself may have sufficient strength to serve as the support frame for all aircraft components, so that the separate support frame depicted may not be required.)

Tail structure: Vertical stabilizer having width (side-to-side) of about 8.5 feet and length (front-to-back) of about 2-3 feet, with the stabilizer positioned at a height of about 20 inches above the top of the propellers, and about 32 inches above the top of the fuselage.

Ground vehicle portion: About 5 feet wide, with wheels positioned about 3½ to 7 feet apart.

Figure 2A:
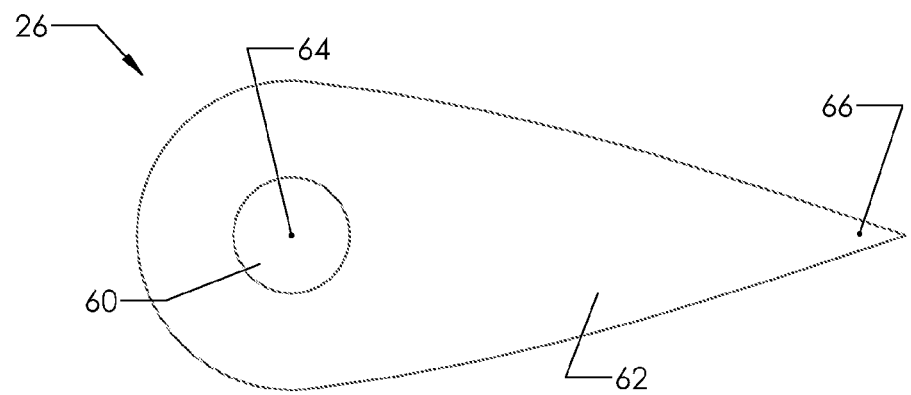
FIGS. 2A-2B are a cross-sectional views of a support arm section of the air vehicle of FIGS. 1A-1G.
Figure 2B:
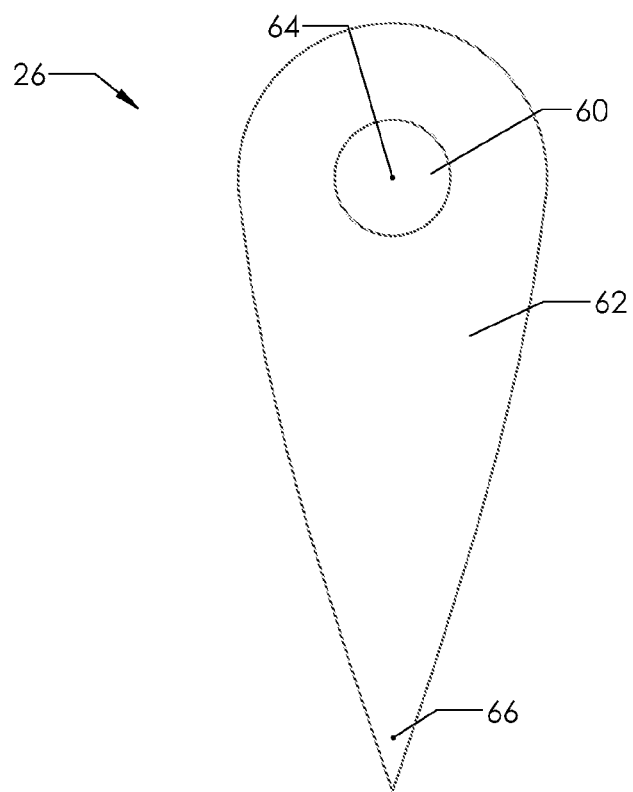
Figure 3A:
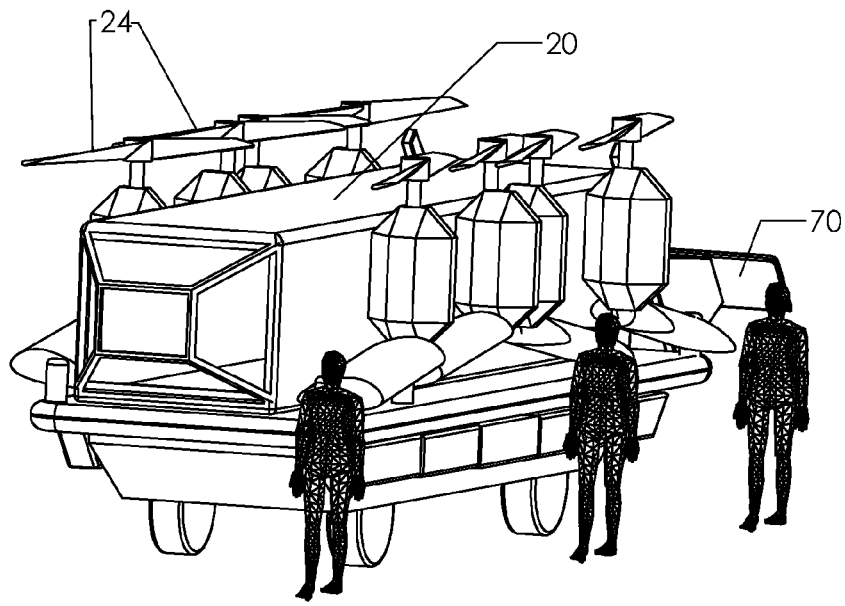
FIGS. 3A-3D are front perspective, top perspective, front, and side views, respectively, of the air vehicle of FIGS. 1A-1G, with the engines and support arms/wings stowed according to the embodiment of the invention.
Figure 3B:
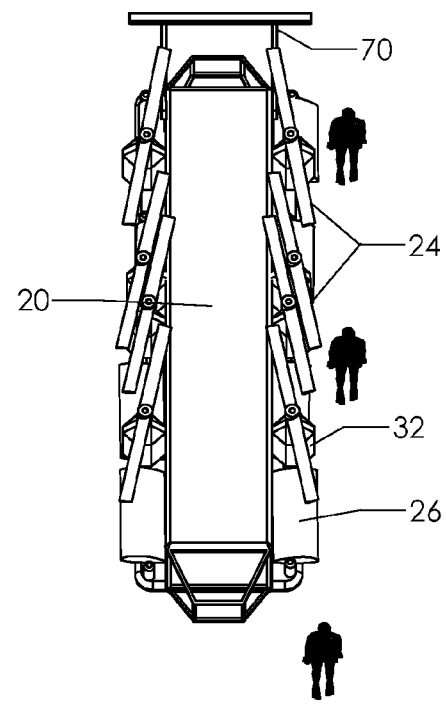
Figure 3C:
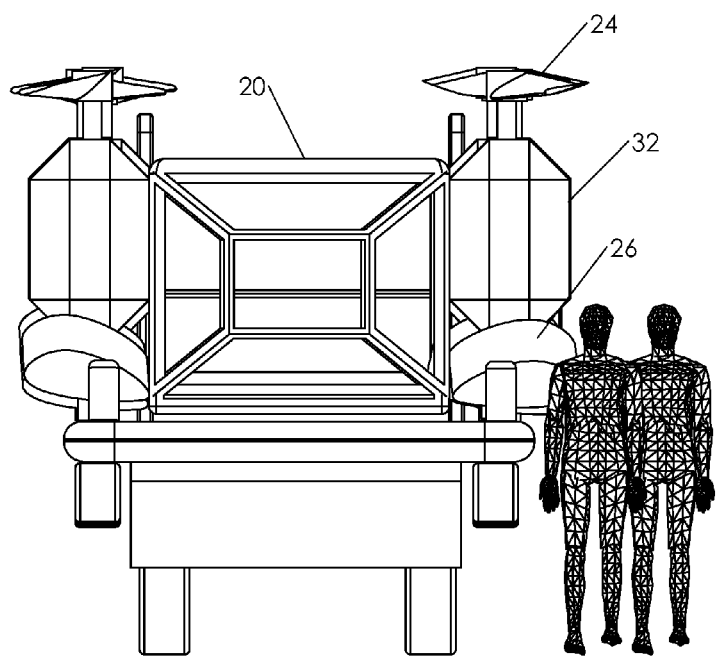
Figure 3D:
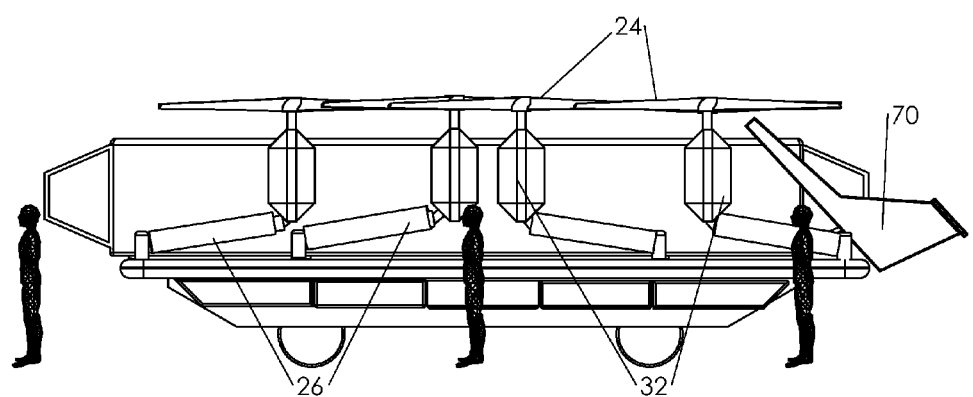

FIGS. 2A-2B depict cross-sectional views of a support arm 26 according to an embodiment of the invention. The support arm 26 includes a central cylindrical support shaft 60 surrounded by an airfoil 62. The airfoil 62 is generally symmetrical, and is relatively thick and relatively short in chord length. The airfoil 62 can rotate about the axis 64 of the support arm 26. Rotation of the airfoil 62 may occur about the support shaft 60, or in conjunction with rotation of the support shaft 60 itself. The rotation of the airfoil 62 may be aided by a motor or other mechanism that positively drives the rotation, and/or the airfoil 62 may be configured to rotate freely (or partially freely) through at least a portion of a rotation in response to the effects of gravity and airflow. For example, the airfoil may be configured to freely rotate by at least 30 degrees (or about 30 degrees), by at least 45 degrees (or about 45 degrees), by at least 60 degrees (or about 60 degrees), by at least 90 degrees (or about 90 degrees), by at least 180 degrees (or about 180 degrees), and/or by at least 360 degrees (or about 360 degrees) 00 i.e., through a full rotation. The airfoil may even be configured to rotate without restriction through multiple, or even unlimited, rotations about its rotational axis. In operation of the air vehicle 10, the airfoil 62 may be rotated to the generally vertical position of FIG. 2B for a vertical takeoff, thus reducing any drag created by the airfoil 62 against the downward airflow from the propellers. The airfoil 62 can be rotated forward to a more horizontal position (such as the horizontal position of FIG. 2A) for forward flight, which enables the airfoil to reduce drag while also generating lift. The airfoil may include a weight 66 to make the airfoil slightly heavier toward its trailing edge section, so that the airfoil will generally seek its vertical position when horizontally-directed airflow (such as that occurring in forward flight) is minimal.

The support arms may include stability, deployment, safety, and other mechanisms/assemblies/methods such as those set forth in U.S. Utility patent application Ser. No. 12/070,669, the contents of which are expressly incorporated herein. For example, the support arms may be configured to break safely away from the vehicle, and to re-position themselves and/or the engines/propellers with respect to the vehicle, as described and depicted in and for FIGS. 3A-3C, FIGS. 4A-4C, FIGS. 5A-5D, FIGS. 6A-6C, FIGS. 7A-7B, and other portions of U.S. Utility patent application Ser. No. 12/070,669.

FIGS. 3A-3D of the current application depict an embodiment wherein the engines 32, propellers 24, support arms 26, and tail assembly 70 are in their stowed positions against the flight vehicle portion 20. (Note that the propeller blades 24 have been added by hand drawing, and are not necessarily to proper scale in these (otherwise) to-scale drawings.)

While two-bladed propellers have been depicted herein, the invention is not limited so such propellers. While two-bladed propellers may have advantages for stowing, manufacture, and/or travel, propellers with any number of blades can be used with the invention. The propellers may be configured to store in different ways. For example, they may fold along one or more sides, front, back, top, or bottom of the vehicle, or be configured for partial or complete disconnect/reconnect from the vehicle for storage/shipping and/or propeller exchange. Propellers may be able to rotate from their deployed (flight) position to the stowed position, and vice-versa, either manually or via electric, hydraulic, mechanical, etc. methods.

The flight vehicle may include an active flight control system that constantly monitors the flight characteristics, including center of gravity, thrust from each propeller, power from each engine, angle of each propeller, air vehicle speed and attitude, etc., and automatically adjusts one or more of the propeller forward tilt angles, propeller assembly side-to-side angles, engine power, and/or support angles reposition and/or repower one or more of the propellers to maximize the flight performance, including such factors as lift, fuel efficiency, etc. The flight control system may also adjust propeller position with respect to the aircraft (e.g., propeller tilt), engine power/propeller thrust, and center of gravity (via fuel movement, etc.) to compensate for various factors such as loss of one or more engines and/or propellers. When the vehicle is ready to lift off, the active flight control system can adjust the RPMs of each engine via throttle controls in order to balance the thrust from the engines with respect to the center of gravity of the vehicle. If the center of gravity is off-center, the air vehicle can compensate by adjusting engine power (thereby adjusting propeller thrust) and also by transferring fuel between different fuel tanks.

Vehicles according to the invention may use various fuel systems, including fuel regulation/balancing systems, tanks, etc., as described in detail with respect to FIG. 8 and other portions of U.S. Utility patent application Ser. No. 12/070,669, the contents of which are expressly incorporated herein. The air vehicle may be configured to have fuel drop tanks secured thereto. Air vehicles according to the invention may also include fuel lines and connections to transfer fuel between a transport module, such as a ground vehicle, to the air vehicle, or vice versa. The air vehicle will typically include one or more gas fuel openings through which fuel can be added in the traditional manner (e.g., from a traditional gas pump such as found at gas stations). The air vehicle may be configured to automatically transfer fuel to and/or from a transport module when available. The air vehicle may also include in-air refueling devices to permit the air vehicle to be refueled in flight by an airborne tanker airplane or other airborne refueling platform. Fuel tanks/bladders may be located in or on the ground vehicle portion, which can be in addition to (or in lieu of) other fuel tanks/bladders on the flight vehicle portion, etc.

Various ground vehicle portions, cargo portions, armaments, sensors, flight control systems, uses, etc. are also within the scope of the invention, including those described in U.S. Utility patent application Ser. No. 12/070,669. The current vehicle, devices, and methods can be used with, and for, all devices and methods set forth in U.S. Utility patent application Ser. No. 12/070,669.

Enhanced flight performance in forward horizontal flight can be achieved by making changes to propeller position and/or power. While in vertical take-off mode it may be desirable for all propellers to be essentially planar with the horizontal, in forward flight one or more of the propellers may be angled forward and/or power may be increased to some propellers and/or reduced or even eliminated to other propellers.

Figure 4:
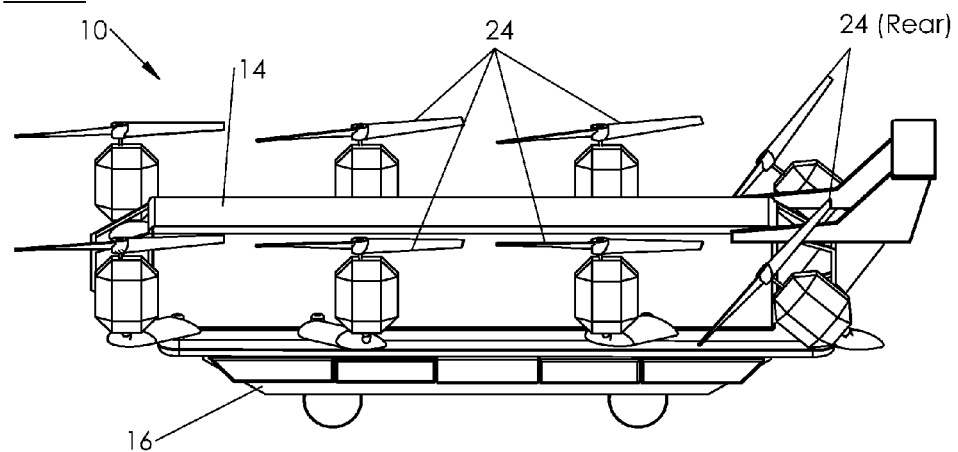
FIG. 4 is a side perspective view of the flight vehicle of FIGS. 1A-1G, with rear engines tilted forward.

FIG. 4 depicts an air vehicle 10 (similar to that depicted in FIG. 1A) in a forward flight configuration, wherein the front-most six (6) propellers 24 are each tilted slightly forward by a small angle (or can be horizontal, i.e., zero angle of tilt) and at generally the same heights with respect to the fuselage 14. However, the rear-most propeller pair 24 rear has been moved substantially, so that the propellers are at forward tilt angles of about 80 degrees. Note that additional propellers could also be rotated forward and/or lowered to achieve even greater speeds. Depending on the particular application, including the lift characteristics of the airframe and propellers, etc.), power could be discontinued to some of the propellers (e.g., to the front-most propellers, and/or to the rear-most propellers) during forward flight, and these propellers could be allowed to autorotate in order to generate sufficient lift to maintain the vehicle at a desired altitude.

Figure 5:
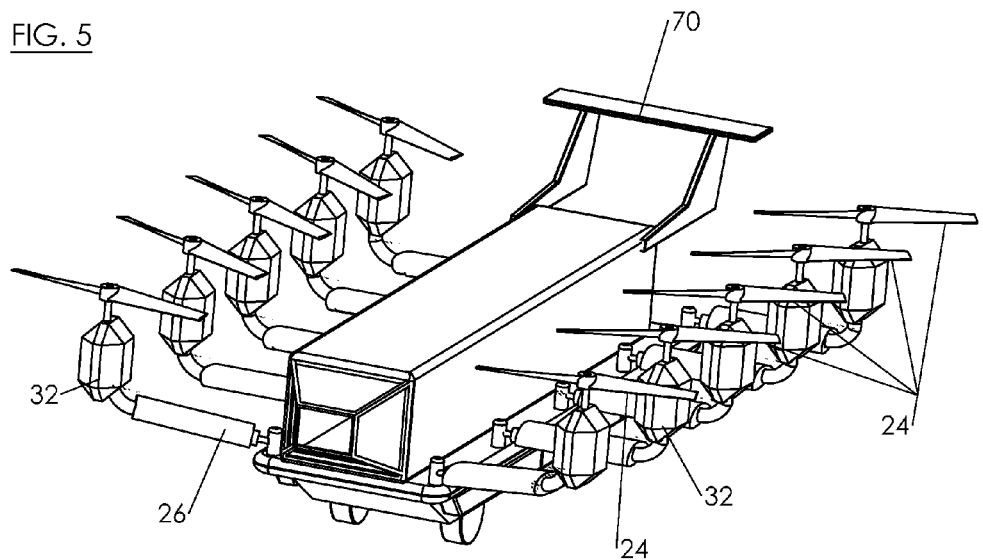
FIG. 5 is a perspective view of an air vehicle according to an embodiment of the invention.

FIG. 5 depicts a further embodiment of the invention, wherein a vehicle 10 includes a flight vehicle portion 20 having an odd number of engines 32 and propellers 24 on each side thereof. In the particular embodiment of FIG. 5, there are 5 engines 32/propellers 24 on each side, for a total of 10 engine/propeller assemblies on the flight vehicle portion 20. The use of an odd number of propellers on each side of the flight vehicle portion 20 may add enhanced stability to the aircraft in normal flight as well as in case of the loss of a front or rear engine. As shown in FIG. 6, such a vehicle 10 can have propellers which are rotating oppositely to propellers on the immediate opposite side of the fuselage 14 (as in propellers 24(L1) and 24(R1), etc.), and also which are rotating opposite to the rotational direction of their immediate neighboring propellers front-to-back (as in propellers 24(L1) and 24(L2), 24(L2) and 24(L3), etc.). In such an embodiment, the propellers at opposing corners (e.g., 24(R1) compared to 24(L5), and 24(L1) compared to 24(R5), are in opposite rotation. This opposite rotation of the "corner" propellers may enhance stability.

Other rotational directions and physical repositioning of the propellers is also within the scope of the invention. For example, propellers could be repositioned up and down (or in and out), including above and/or below the airframe, to achieve improved aerodynamic performance. Propellers to which power has been eliminated may be secured in a fixed position (such as a position generally parallel to the direction of forward flight in order to minimize drag), or may be permitted to autorotate (in which case they will typically generate some lift). A more aerodynamically efficient shell could be used for and/or with the airframe to give improved performance.

Figure 7A:
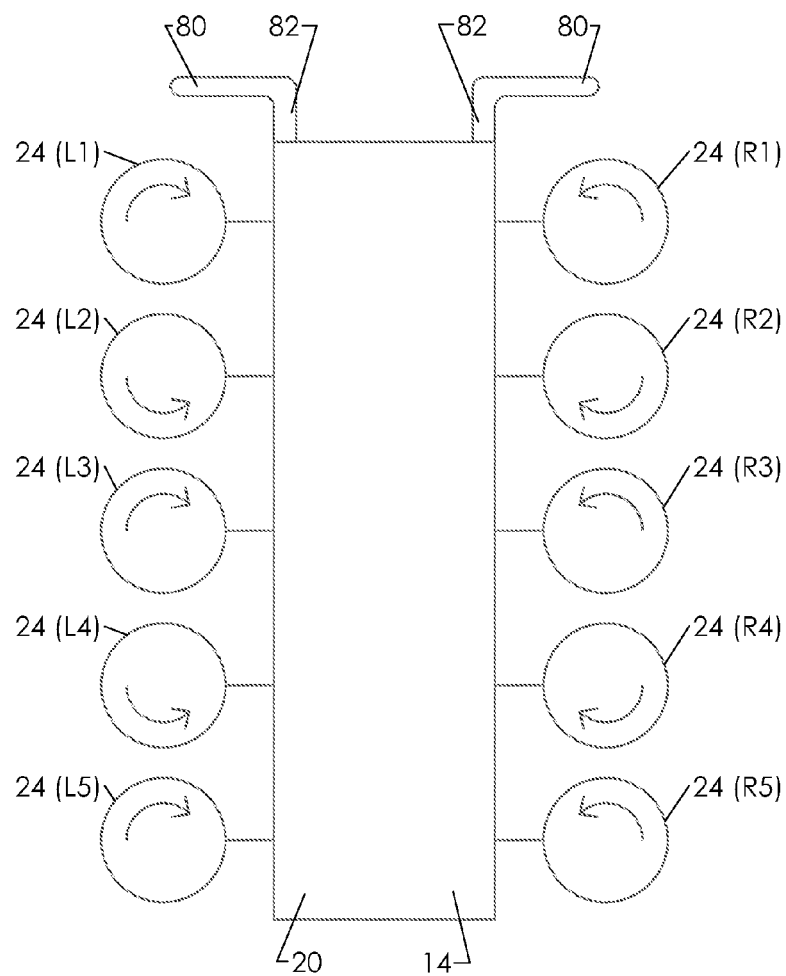
FIGS. 7A-7B are top and side views, respectively, of an air vehicle according embodiment of the invention.
Figure 7B:
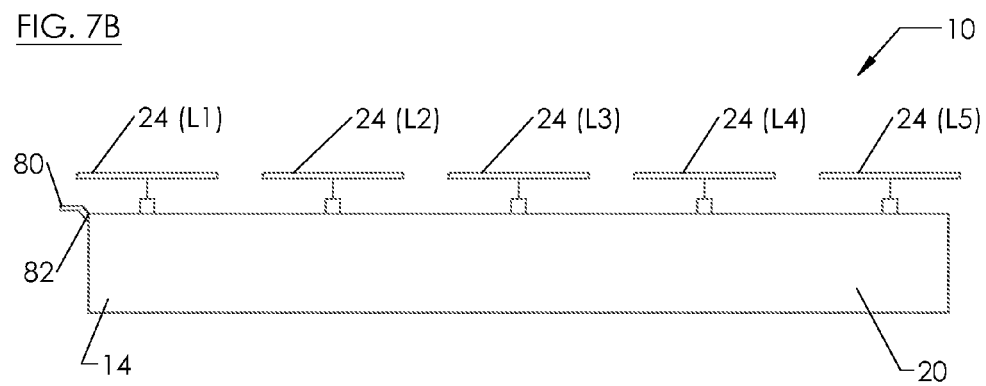

FIGS. 7A-7B depict a further embodiment of the invention, wherein a forward airfoil 80 has been provided to generate an initial upward airflow underneath the retreating (inward) blade of the front propellers 24(L1) and 24(R1) during forward flight. The retreating blade (with respect to the airflow) of a propeller/prop inherently produces somewhat less lift than the advancing blade. This initial upward airflow from the airfoil 80 can compensate for this imbalance. Note that the airfoil 80 is depicted, in the particular embodiment of FIGS. 7A-7B, at a position just in front of and slightly below the retreating blade of the foremost propellers 24(L1) and 24(R1), in order to provide the additional lift to the retreating blade. Additionally, by rotating adjacent (with respect to front-to-back of the vehicle) propellers in opposing fashions, the advancing (and inward) blade of an immediately upstream propeller (e.g., 24(L2) will produce additional lift, which can be passed downstream in the airflow to the retreating blade (also inward) of the immediately downstream propeller (e.g., 24(L3) for 24(L2)). Note that the airfoil 80 is positioned on a support 82 extending from front of the flight vehicle portion 20. The airfoil 80 and support 82 may be retractable or fixed.

Figure 8A:
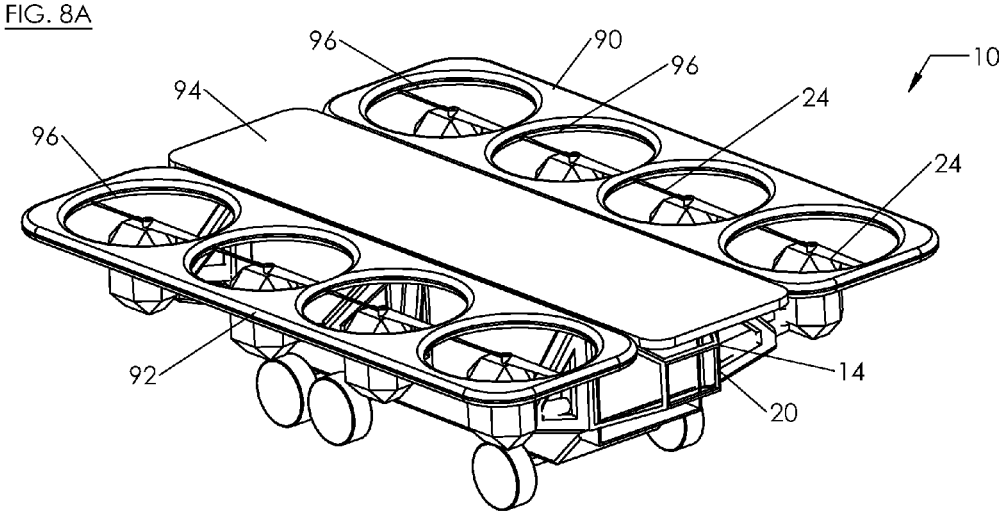
FIGS. 8A-8C are front angled perspective, front head-on perspective, and front views, respectively, of an air vehicle with deployed propeller guards according to an embodiment of the invention.
Figure 8B:
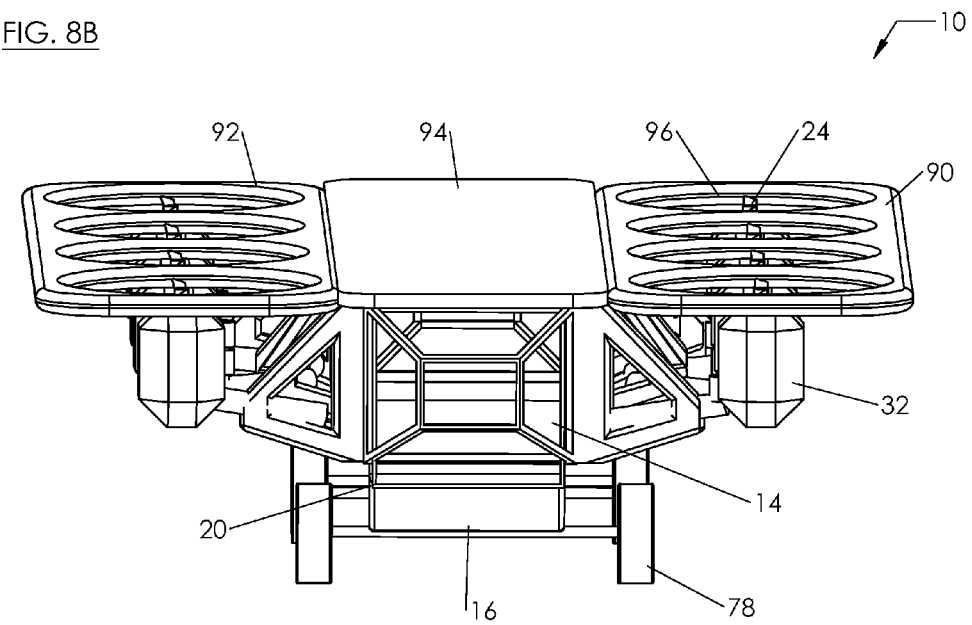
Figure 8C:
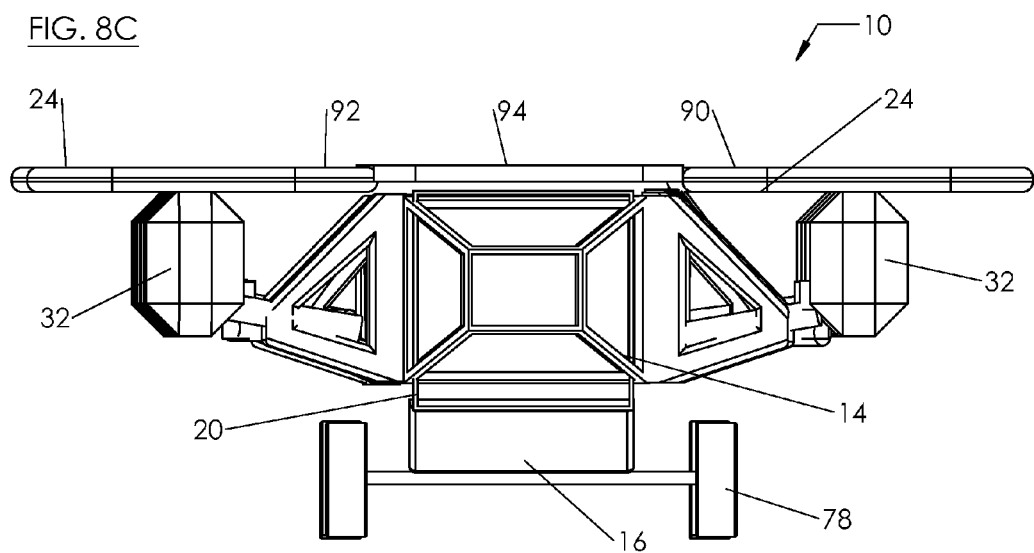

FIGS. 8A-8C depict a vehicle 10 according to an embodiment of the invention, wherein the flight vehicle portion 20 has a deployable propeller guard in the form of two (2) deployable and retractable (for stowage) guards 90 and 92 extending from either side of the top 94 of the fuselage 14. Each guard 90, 92 forms a series of openings 96, which in the particular embodiment depicted are generally circular openings, sized and configured to receive a rotating propeller 24 therein. The openings 96 are each sized somewhat larger than the disc defined by a rotating propeller 24 in order to accommodate same. The guards 90, 92 extend across and just below the plane defined by the propellers 24, especially at the most outward (from the fuselage) portions thereof, in order to prevent the propellers from striking objects and/or personnel that might be present, particular when the vehicle 10 is on the ground. Guard 92 extends from and is secured to the right side of the fuselage top 94, and guard 90 extends from and is secured to the left side of the fuselage top 94.

In one method of using the vehicle 10, the guards 90, 92 are deployed just before landing, or upon landing, or just after landing in order to provide the necessary protection. Similarly, the guards 90, 92 may be retracted or otherwise stowed just before lift-off, during lift-off, or just after lift-off from the ground.

Figure 8D:
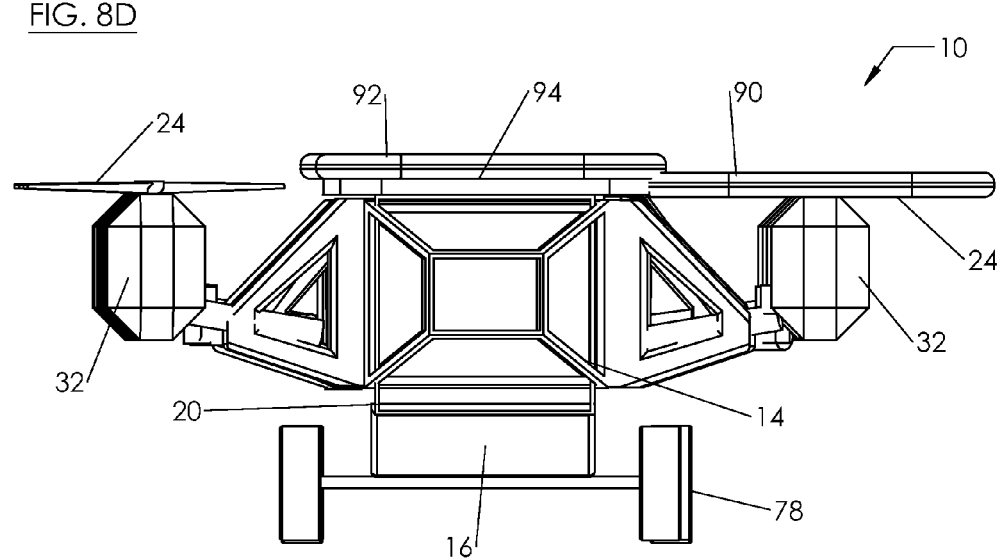
FIG. 8D is a front view the air vehicle of FIGS. 8A-8C, with partially deployed and partially retracted propeller guards according to an embodiment of the invention.

FIG. 8D depicts the vehicle 10 of FIGS. 8A-8C, but with the guards 90, 92 halfway through the process of being stowed. More specifically, guard 92 has been retracted, which in the particular embodiment depicted involved rotating the guard 92 about a hinge-like mechanism (not shown) secured to the right side of the fuselage top 94. Guard 90 is still deployed to cover the propellers 24 on the left side of the vehicle 10.

Note that FIG. 8D is also illustrative of the vehicle configuration when the vehicle 10 is halfway through the process of deploying the guards, with one guard 90 deployed out over the left side of the vehicle 10 to cover the propellers 24 on that side, but with the other guard 92 still positioned on the fuselage top 94 (i.e., stowed/retracted).

Figure 8E:
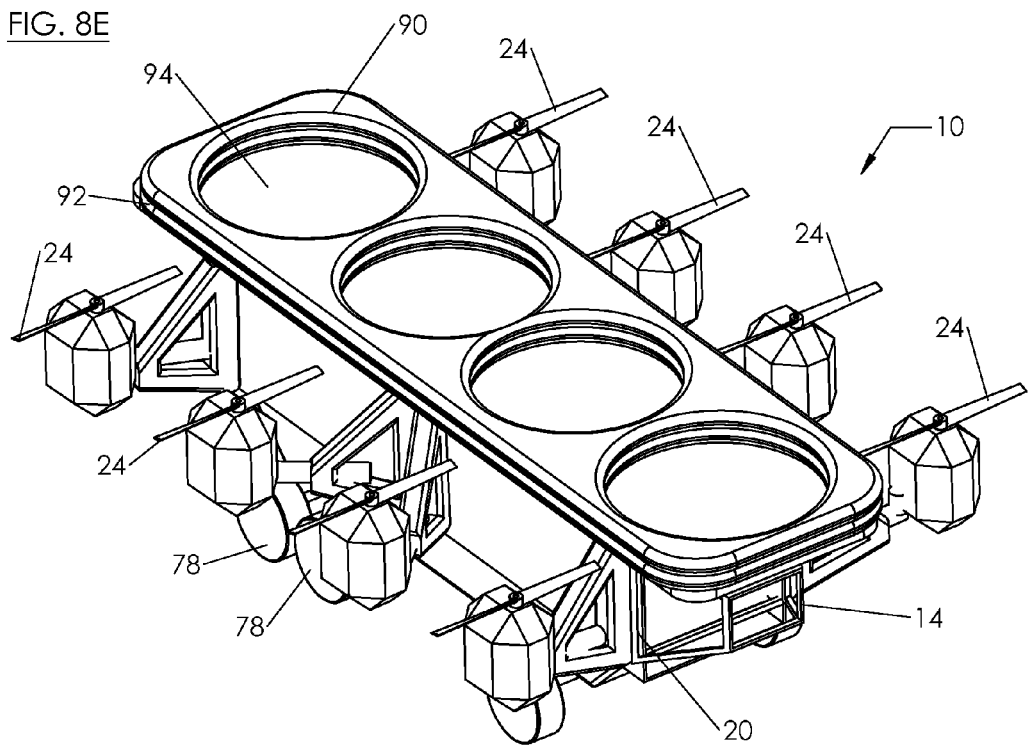
FIGS. 8E-8G are front angled perspective, front head-on perspective, and front views, respectively, of an air vehicle with retracted propeller guards according to an embodiment of the invention.
Figure 8F:
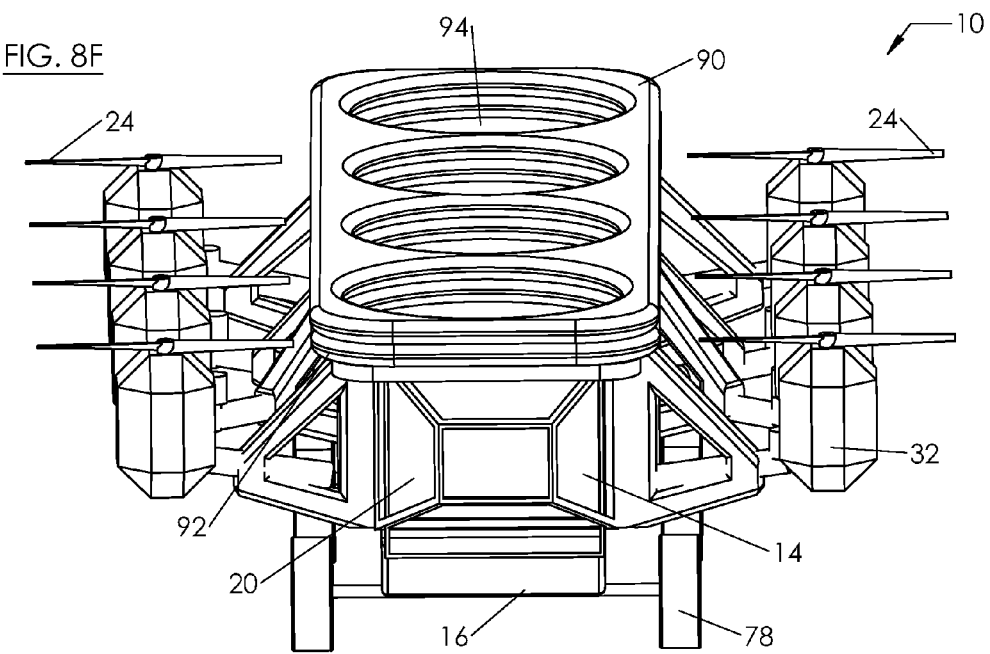
Figure 8G:
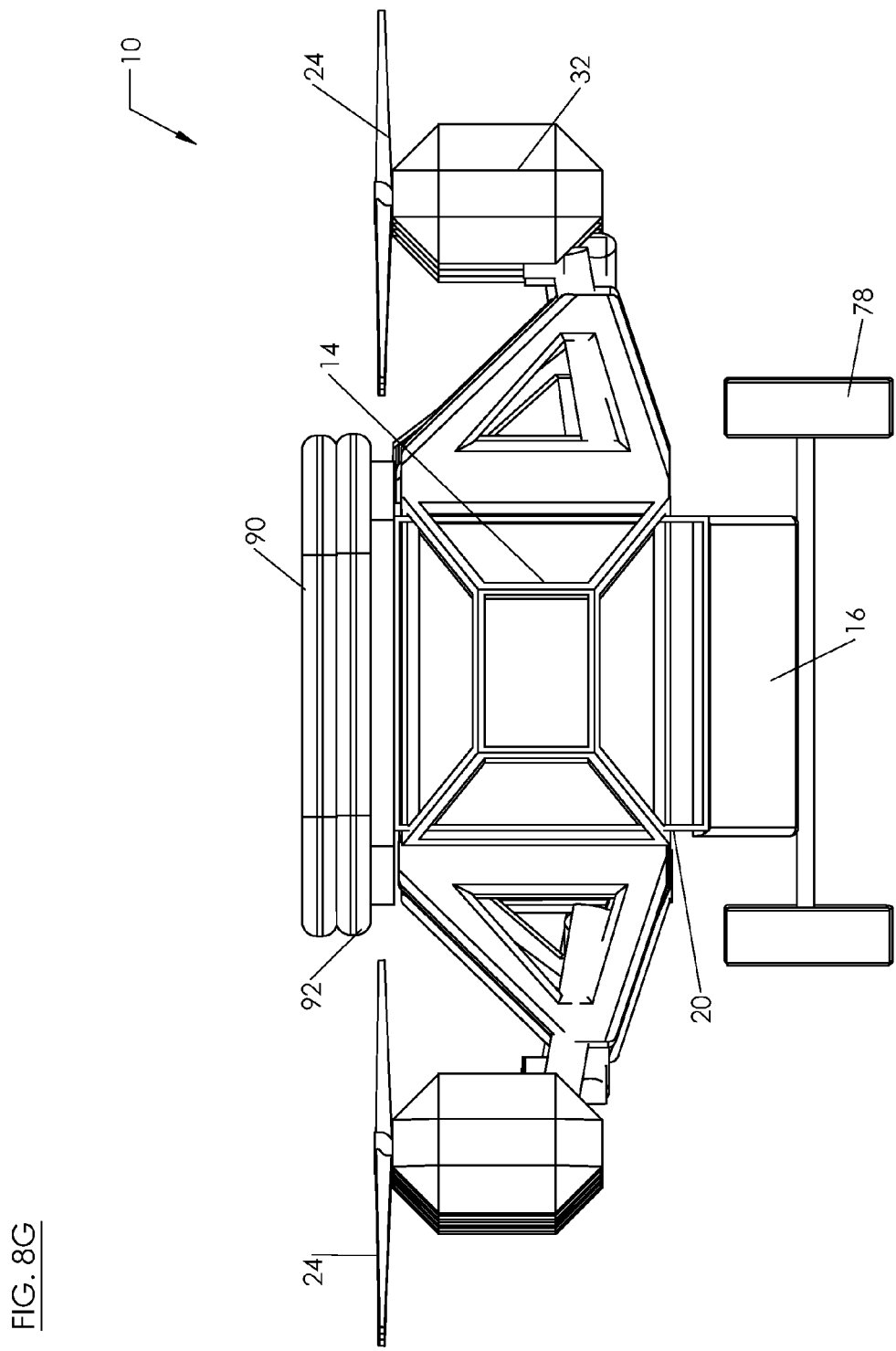

FIGS. 8E-8G depict the vehicle 10 of FIGS. 8A-8C, but with the guards 90, 92 fully retracted/stowed. More specifically, guard 92 has been retracted, which in the particular embodiment depicted involved rotating the guard 92 about a hinge-like mechanism (not shown) secured to the right side of the fuselage top 94. Guard 92 now rests on the fuselage top 94. Guard 90 has also been retracted/stowed in a fashion similar to the that of guard 92, except that guard 90 is positioned on and over (i.e., stacked on top of) guard 92, whereas guard 92 is positioned directly on top of the fuselage top 94. The stacked guards 90, 92 form a generally low and aerodynamic profile when stowed/retracted, and the propellers 24 are fully exposed.

Note that other forms of guards and apparatus/methods for deployment and retraction thereof are also within the scope of the invention, including guards which extend out from the front of the vehicle, bottom of the vehicle, from the engines and/or support arms, etc. Also, various shapes and other configurations of the guards themselves are also within the scope of the invention, including guard which form a single opening to accommodate multiple propellers (as opposed to the "one propeller 24 per opening 96" configuration of FIGS. 8A-8G). For example, a guard having a single generally elongated opening could be extended over the side of a vehicle such as depicted in FIGS. 8A-8G, except the single generally elongated opening could be configured to receive all 4 propellers on the particular side of the vehicle.

While propellers have been discussed herein, rotors could be used in some versions of such air vehicles, such as where the air vehicles are very large and the associated propellers (rotors) have long lengths.

Note that FIGS. 1A-1G, 3A-3D, 4, and 5 are CAD-based images which are each drawn to scale, so that dimensions are consistent within each figure.

Although the invention has been described in terms of particular embodiments and applications, one of ordinary skill in the art, in light of this teaching, can generate additional embodiments and modifications without departing from the spirit of or exceeding the scope of the claimed invention. For example, although the above devices and methods are described for use in a particular manner, the devices and methods described herein could be used in a variety of different methods of use. As a further example, it will be recognized that the embodiments described above and aspects thereof may be modified, via changes in propeller and/or engine numbers and placement, etc., to adapt a particular situation or device to the teachings of the invention without departing from the essential scope thereof. Accordingly, it is to be understood that the drawings and descriptions of specific embodiments herein are proffered by way of example to facilitate comprehension of the invention, and should not be construed to limit the scope thereof.

What is claimed is:

1. A flight vehicle, comprising:
    a main airframe, the airframe defining an airframe horizontal plane and having an airframe front, airframe back, airframe left side, and airframe right side;
    at least four propeller supports extending from the main airframe, wherein each propeller support comprises a proximal end, a distal end, and an elongated main support body between the proximal end and the distal end, wherein the elongated main support body comprises a longitudinal axis, wherein the proximal end is secured to the main airframe and the elongated main support extends sideways from the main airframe, wherein at least two propeller supports are positioned with the distal ends thereof to the left of the airframe left side, and at least two propeller supports are positioned with the distal ends thereof to the right of the airframe right side;
    at least four propellers, wherein at least one of the four propellers is positioned at the distal end of each propeller support;
    at least four movable airfoils, each airfoil comprising a leading edge, a trailing edge, a span, and a chord line, wherein at least one of the four movable airfoils is positioned on a corresponding propeller support of the at least four propeller supports, wherein the span of each movable airfoil is positioned substantially parallel to the longitudinal axis of the elongated main support body of the corresponding propeller support, and wherein the movable airfoil is configured to be rotated about an airfoil rotational axis, wherein the airfoil rotational axis is substantially parallel to the longitudinal axis of the elongated main support body, wherein each movable airfoil is configured to rotate from a first position wherein the chord line is substantially perpendicular to the airframe horizontal plane and the trailing edge is positioned below the leading edge, to a second position wherein the chord line is substantially parallel to the airframe horizontal plane and the trailing edge is positioned behind the leading edge, wherein each airfoil is a free wing that is freely rotatable about the airfoil rotational axis and has an angle of attack determined solely by aerodynamic forces acting on the airfoil.

2. The flight vehicle of claim 1, wherein each airfoil is freely rotatable responsive to aerodynamic forces through at least 30 degrees about the airfoil rotational axis.

3. The flight vehicle of claim 2, wherein each airfoil is freely rotatable responsive to aerodynamic forces through at least 90 degrees about the airfoil rotational axis.

4. The flight vehicle of claim 3, wherein each airfoil is freely rotatable responsive to aerodynamic forces through multiple rotations about the airfoil rotational axis.

5. The flight vehicle of claim 1, wherein each airfoil is a generally symmetrical airfoil.

6. The flight vehicle of claim 1, wherein each airfoil defines a thickness and a chord length, wherein the airfoil maximum thickness is at least 25 percent of the airfoil chord length.

7. A method of operating an air vehicle, comprising:
    providing an air vehicle comprising:
        a main airframe, the airframe defining an airframe horizontal plane and having an airframe front, airframe back, airframe left side, and airframe right side;
        at least four propeller supports extending from the main airframe, wherein each propeller support comprises a proximal end, a distal end, and an elongated main support body between the proximal end and the distal end, wherein the elongated main support body comprises a longitudinal axis, wherein the proximal end is secured to the main airframe and the elongated main support extends sideways from the main airframe, wherein at least two propeller supports are positioned with the distal ends thereof to the left of the airframe left side, and at least two propeller supports are positioned with the distal ends thereof to the right of the airframe right side;
        at least four propellers, wherein at least one of the four propellers is positioned at the distal end of each propeller support;
        at least four movable airfoils, each airfoil comprising a leading edge, a trailing edge, a span, and a chord line, wherein at least one of the four movable airfoils is positioned on a corresponding propeller support of the at least four propeller supports, wherein the span of each movable airfoil is positioned substantially parallel to the longitudinal axis of the elongated main support body of the corresponding propeller support, and wherein the movable airfoil is configured to be rotated about an airfoil rotational axis, wherein the airfoil rotational axis is substantially parallel to the longitudinal axis of the elongated main support body, wherein each movable airfoil is configured to rotate from a vertical flight position wherein the chord line is substantially perpendicular to the airframe horizontal plane and the trailing edge is positioned below the leading edge, to a forward flight position wherein the chord line is substantially parallel to the airframe horizontal plane and the trailing edge is positioned behind the leading edge, wherein each airfoil is a free wing that is freely rotatable about the airfoil rotational axis and has an angle of attack determined solely by aerodynamic forces acting on the airfoil;
    positioning the air vehicle on a takeoff surface;
    positioning each movable airfoil in the vertical flight position; and rotating the propellers to generate sufficient propeller thrust to lift the vehicle substantially vertically off the takeoff surface, whereby the vehicle lifts from the takeoff surface.

8. The method of claim 7, wherein positioning each movable airfoil in the vertical flight position comprises rotating the propellers to generate sufficient airflow to cause each movable airfoil to rotate to the takeoff position.

9. The method of claim 7, further comprising:
rotating one or more of the movable airfoils to control the position of the air vehicle.

10. The method of claim 7, wherein the air vehicle comprises a horizontal thrust generator configured to provide horizontal thrust, wherein the method further comprises:
activating the horizontal thrust generator to provide horizontal thrust in a forward direction; and
positioning each movable airfoil in the forward flight position.

11. The method of claim 10, further comprising:
rotating one or more of the movable airfoils to control the direction of the air vehicle.

12. The method of claim 10, wherein at least one of the propellers is a tilting propeller configured to be tilted forward or backward with respect to the air vehicle horizontal plane, wherein the horizontal thrust generator comprises the tilting propeller, wherein activating the horizontal thrust generator comprises tilting the tilting propeller forward with respect to the air vehicle horizontal axis.

13. The method of claim 7, wherein each movable airfoil is configured to be rotated to a STOL (short takeoff and landing) position wherein the trailing edge is below and behind the leading edge and the chord line is at an angle between 15 and 75 degrees from the air vehicle horizontal plane, the method comprising:
positioning the air vehicle on the takeoff surface;
positioning each movable airfoil in the STOL position; and
rotating the propellers to generate sufficient propeller thrust to move the air vehicle forward and into the air.

14. The method of claim 13, wherein at least two of the propellers are tilting propellers configured to be positioned with a forward tilt angle of at least 15 degrees with respect to the air vehicle horizontal plane, wherein the method comprises:
positioning the tilting propellers with a forward tilt angle of at least 15 degrees with respect to the air vehicle horizontal plane.

15. A modular vehicle, comprising:
A flight vehicle module, comprising:
a main airframe, the airframe defining an airframe horizontal plane and having an airframe front, airframe back, airframe left side, and airframe right side;
a plurality of propeller supports extending from the main airframe, wherein each propeller support comprises a proximal end, a distal end, and a generally straight elongated main support body between the proximal end and the distal end, wherein the elongated main support body comprises a support body longitudinal axis, wherein the proximal end is secured to the main airframe and the elongated main support extends sideways from the main airframe, wherein at least one propeller support is positioned with the distal end thereof to the left of the airframe left side, and at least one propeller support is positioned with the distal end thereof to the right of the airframe right side, wherein each of the plurality of propeller supports is configured to rotate about a support rotational axis, wherein the support rotational axis is substantially perpendicular to the airframe horizontal plane, wherein each of the plurality of propeller supports can be rotated from a stowed position wherein the distal end thereof is substantially adjacent the airframe to a deployed position wherein the distal end thereof is substantially displaced sideways from the airframe;
a plurality of propellers, wherein at least one of the plurality of propellers is positioned at the distal end of each propeller support;
a plurality of movable airfoils, each airfoil comprising a leading edge, a trailing edge, a span, and a chord line, wherein at least one of the plurality of movable airfoils is positioned on a corresponding propeller support of the plurality of propeller supports, wherein the span of each movable airfoil is positioned substantially parallel to the longitudinal axis of the elongated main support body of the corresponding propeller support, and wherein the movable airfoil is configured to be rotated about an airfoil rotational axis, wherein the airfoil rotational axis is substantially parallel to the longitudinal axis of the elongated main support body, wherein each movable airfoil is configured to rotate from a first position wherein the chord line is substantially non-parallel to the airframe horizontal plane and the trailing edge is positioned below the leading edge, to a second position wherein the chord line is substantially parallel to the airframe horizontal plane and the trailing edge is positioned behind the leading edge, wherein each airfoil comprises a proximal end closest to the airframe and a distal end furthest from the airframe, wherein each airfoil angles upward with respect to the airframe from the proximal end to the distal end, wherein each airfoil is a free wing that is freely rotatable about the airfoil rotational axis and has an angle of attack determined solely by aerodynamic forces acting on the airfoil; and
a ground vehicle module, comprising a main ground vehicle body and a plurality of wheels, wherein the ground vehicle module is detachable from the flight module, and the ground vehicle module is configured to be driven on the ground separately from the flight vehicle module.

16. The modular vehicle of claim 15, wherein each airfoil has a center of lift, and the airfoil rotational axis is positioned substantially at the airfoil center of lift.

17. The modular vehicle of claim 15, the vehicle flight module further comprising:
at least one actuator controlling the rotational position of each airfoil.

18. The modular vehicle of claim 15, wherein each airfoil is weighted such that in the absence of airflow the airfoil will rotate responsive to gravity to the first position wherein the chord line is substantially non-parallel to the airframe horizontal plane and the trailing edge is positioned below the leading edge.

19. The modular vehicle of claim 15, wherein the air vehicle module comprises landing supports with sufficient height to permit the ground vehicle module to be driven under the main airframe of the air vehicle module when the air vehicle module is resting on the ground and supported by the landing supports.

* * * * *